United States Patent [19]

Di Vigano

[11] 4,363,630

[45] Dec. 14, 1982

[54] SHIP'S HULL WITH A HELICAL CHANNEL AHEAD OF EACH PROPELLER AND METHOD OF ESTABLISHING THE SHAPE OF THE SAME

[76] Inventor: Giovanni B. T. Di Vigano, 30 Via Pusiano, Milano, Italy

[21] Appl. No.: 842,925

[22] Filed: Oct. 17, 1977

Related U.S. Application Data

[63] Continuation-in-part of Ser. No. 671,747, Mar. 30, 1976, abandoned.

[30] Foreign Application Priority Data

Apr. 4, 1975 [DE] Fed. Rep. of Germany ....... 2514784
Aug. 16, 1975 [DE] Fed. Rep. of Germany ....... 2536425

[51] Int. Cl.$^3$ ............................................. B63H 5/16
[52] U.S. Cl. ...................... 440/69; 114/57; 440/79
[58] Field of Search ............... 114/56, 57, 166; 73/147, 148; 440/67, 69, 79

[56] References Cited

U.S. PATENT DOCUMENTS

| | | | |
|---|---|---|---|
| 1,801,875 | 4/1931 | Melcher | 114/57 |
| 2,349,286 | 5/1944 | Kreitner et al. | 440/79 |
| 2,729,182 | 1/1956 | Tommasi | 114/57 |
| 3,455,263 | 7/1969 | Nonnecke | 114/57 |

FOREIGN PATENT DOCUMENTS

| | | | |
|---|---|---|---|
| 1506733 | 7/1969 | Fed. Rep. of Germany | 114/56 |
| 359304 | 4/1906 | France | 114/56 |
| 844060 | 5/1969 | Italy . | |
| 520984 | 5/1940 | United Kingdom | 115/42 |

*Primary Examiner*—Sherman D. Basinger
*Attorney, Agent, or Firm*—Frishauf, Holtz, Goodman & Woodward

[57] ABSTRACT

A clear annular space is provided around the propeller shaft shroud between the aft end of the helical channel proper and the propeller disc. The helical channel is brought far enough around the shaft shroud root so that the aft end of the web formed where the helical channel becomes tangent to the outer hull skin is at an angle not exceeding 40° above the horizontal and preferably not more than 35°. The overall cross-sectional taper of the afterbody takes into account the shaft shrouds as well as the rest of the hull. Because it has been found that the effectiveness of helical channels in smoothing out the torque loads on propeller blades is difficult to predict and sometimes is negative, the method of establishing the configuration by model tests is important. In that method, the radial component of water flow with respect to the propeller disc may be neglected, but both the axial and the peripheral component must be considered in establishing a favorable hull configuration.

49 Claims, 26 Drawing Figures

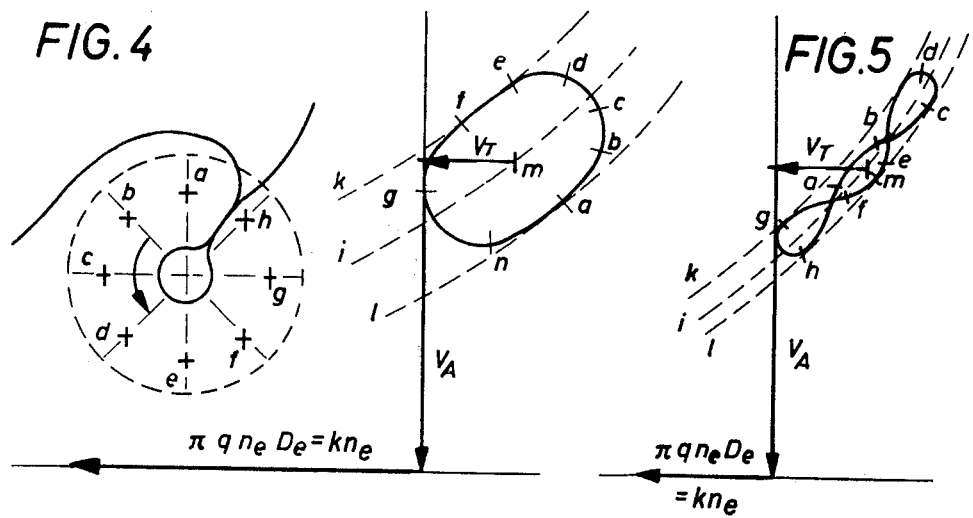
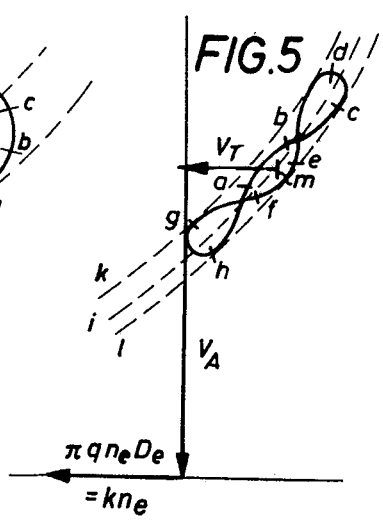
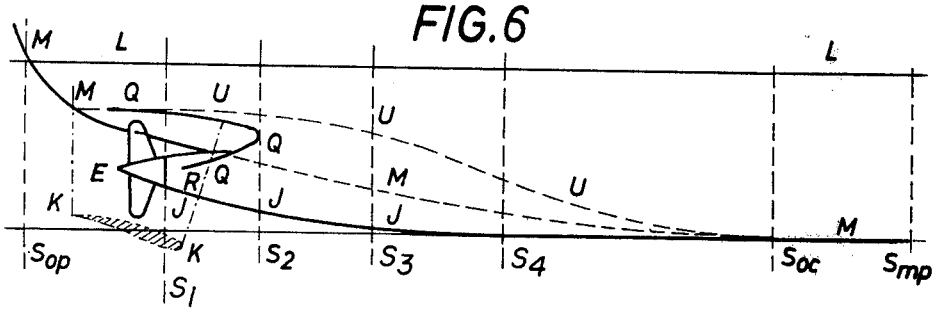
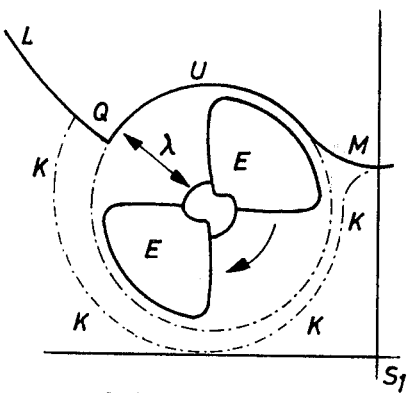
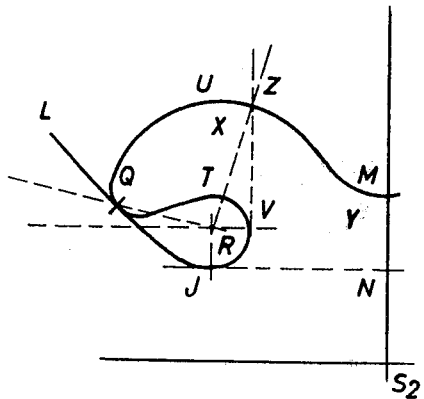

FIG. 17.
FIG. 18.
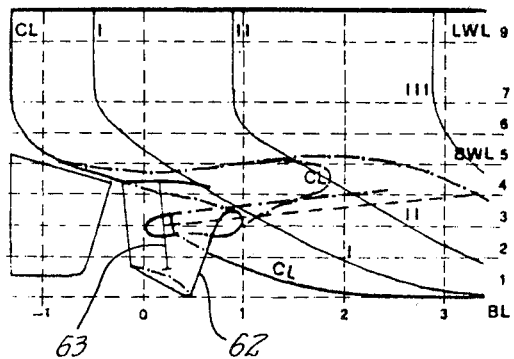
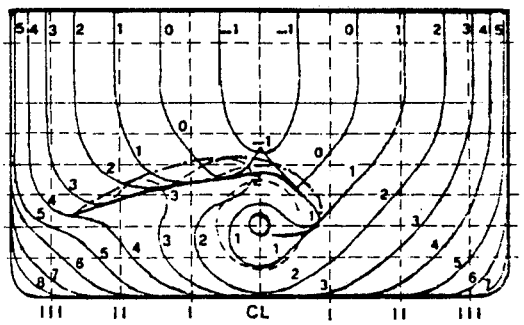
FIG. 19.
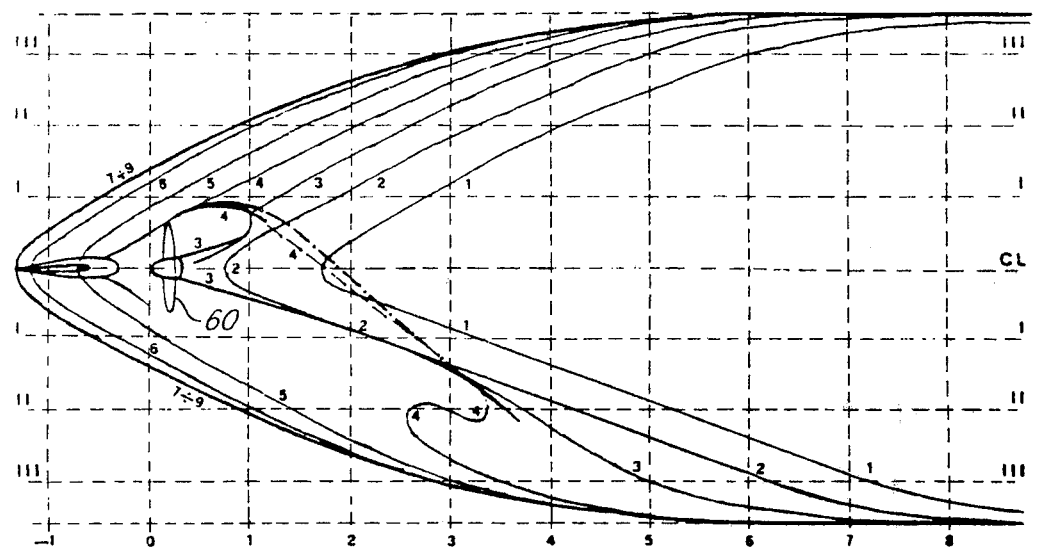
FIG. 20.
FIG. 21.
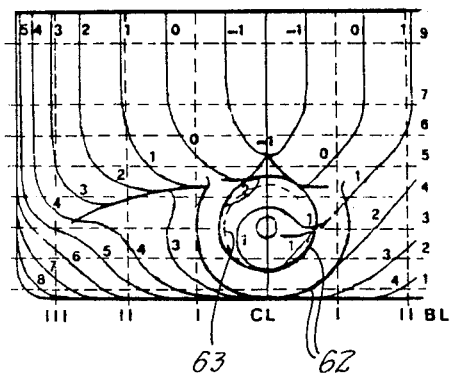
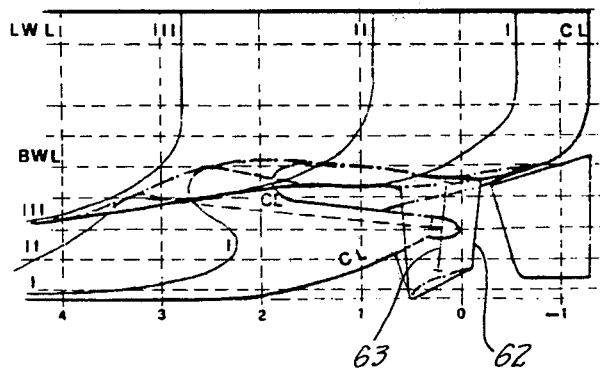

SHIP'S HULL WITH A HELICAL CHANNEL AHEAD OF EACH PROPELLER AND METHOD OF ESTABLISHING THE SHAPE OF THE SAME

This application is a continuation-in-part of my earlier application Ser. No. 671,747, filed Mar. 30, 1976 and now abandoned.

FIELD OF INVENTION

This invention relates to ship design, more particularly to the design of a ship's hull having a partially helicoidal or cochleaform channel leading towards a propeller or towards each of a plurality of propellers provided for the propulsion of the ship. The invention comprehends both a method of hull design and hull configuration features found to be advantageous, as of the present time, only by the method of the invention.

DESCRIPTION OF THE PRIOR ART

It is known that the wake produced by the movement of a ship's hull through the water has a substantial influence on the operational characteristics of a ship's propeller. The influence on the water flow of the moving ship's hull causes the average speed of the water flowing to the propeller disc (that is to say the circular surface which is perpendicular to the propeller axis and swept over by the propeller blades) to be smaller than the speed of progession of the ship and not to have the same value at all positions within the propeller disc.

By the wake is here meant, rather than the disturbance in the water left after the passage of a ship, the entire disturbance produced by the passage of the ship through the water, including particularly the disturbances along the after portions of the hull produced by the passage of the foreportions of the hull and by the changing cross sectional shape along the hull length.

The reason for the lack of success of attempts to adapt the propeller to the wake distribution is primarily due to the fact that the wake water speed varies substantially not only on any circle of a predetermined value about the propeller axis, but even in the peripheral direction along any of said circles, to a very substantial extent. It is known that these variations can be somewhat reduced by an oblique setting of the propeller axis, but this expedient is subject to relatively close limits for engineering reasons.

Another approach is to modify the wake by a suitable shaping of the skin of the ship's hull in such a manner that favorable operational conditions are provided for the propeller (see e.g. applicant's U.S. Pat. No. 2,729,182, Italian Pat. No. 844,060 and publication in the periodical "Rivista di Ingegneria", No. 11, November 1960, pages 1 to 16). Specifically, helically shaped channels are provided on the underside of the ship's hull, which impart to the water flowing to an associated propeller ("incident flow") such a tangential or peripheral component that the peripheral water speed produced by the propeller in the propeller stream is at least partly compensated for. Owing to this feature a certain improvement in the degree of efficiency of propulsion can be obtained.

Tests in model tanks, however, of these proposals showed disappointingly little improvement, and sometimes less performance than conventional hulls, and it became evident that a more thorough and complete treatment of the hydrodynamic problems was necessary to realize any substantial degree of benefit from the above described developments. The tests in 1960 and 1963 were reviewed by the present inventor in "Experimental Evaluation of a New Stern Shape," published in International Shipbuilding Progress, Volume 23, No. 258, page 31 (February 1976), so that the variety of results and their possible explanations do not need to be further discussed here. That article also reviews some other tests made since 1963, the results of which were first published in the article, that represent some transition to the present invention, but by no means its full development.

THE PRESENT INVENTION

An object of the present invention is to provide for an additional improvement in the degree of efficiency of propulstion and furthermore to reduce undesirable effects, due to thrust variations at the propeller, such as vibrations and the like.

A further object is to provide a method of devising an improved ship's hull and propeller system combination.

A further object of the invention is to apply the advantage of helical channels effectively to singlescrew ship and to ships having an odd number of propellers.

Briefly, the invention comprehends in the first place a method of designing or establishing the construction shape of the rear portion of a ship's hull of the kind having a helical channel for guiding the flow of water relative to the moving hull towards a propeller when the ship is moving at operating speed, comprising performance of the steps of measuring the water flow relations at the location of the propeller disc of a model, then modifying the model to optimize the shape of the after portion of the hull and, finally, setting up the lines either physically or on paper of the after portion of the hull for the full size ship, the method having the improvement consisting in that the measurement of the flow relations at the location of the propeller disc of a model is a measurement of the tangential and axial velocity components of water flow entering the propeller disc when no propeller is present at enough points around the propeller disc to establish a characteristic curve which gives the incident flow velocity vector against a blade of propeller of a selected configuration at a selected operating speed of revolution, expressed in coordinates of tangential and axial vector components, disregarding any radial components, for various values of the angular position of a propeller blade around the propeller axis. There are established also, beforehand, the thrust values of the blade of the selected propeller for the full range of incident flowed vectors that are of interest and these determinations are used to plot "isodyne" lines on the same vector field on which the characteristic curve diagram is plotted, to show the relation of incident flow of velocity in coordinates of tangential and axial flow velocity and at the same time the range of propeller blade thrust variation. The effective variation of the model in respect of the position of the propeller disc and the location and shape of a helical channel and the cross-sectional taper of the stern portion of the hull on the thrust variation range of a propeller revolution is observed by similarly superposing corresponding modified characteristic curves on the isodyne lines on the vector field plot and these aspects are then modified so as to reduce the thrust variation range of the propeller blade revolution to a point beyond which reduction would no longer be economically justified by the relation of construction complication to the degree of further reduction that is producible. This point is usually reached at or shortly before the stage at which only a small part, if any, of the characteristic curve is intersected by isodyne lines in two points and only two points.

The application of the above method can be brought to bear more quickly on favorable hull shapes with reference to certain general relations that have been discovered by the use of the method and are made available by the present invention to guide the more effective use of the method and constitute in considerable measure new hull stern portion configurations.

The effectiveness of a helical channel providing a desired peripheral component to the flow of water incident upon the so-called propeller disc is substantially raised by having the vortex so produced coincide in direction with the vortex produced by the passage of the ship's hull through the water. In the case of a propulsion system utilizing a pair of counter-rotating propellers, this means that the proportion of the propeller nearer to the median plane of the hull must move downward, which accordingly means that the direction of twist of the helical channel must produce a peripheral component directed away from the median plane of the hull at the portion of the propeller disc directly above the propeller shaft. The desirability of these directions of rotation have been known, but not all forms of such helical channels contribute usefully to propulsion efficiency.

In the case of a propulsion system utilizing a more or less centrally located propeller, particularly in the case of a single propeller, a hull-produced vortex aiding the effect of the helical channel is provided according to the present invention by dissymmetry of the hull, apart from the helical channel serving the propeller, such as produces a faster flow of water around the side of the hull at which the propeller blades move downward, because such a dissymmetry of the hull produces a wake vortex of which the ascending side is towards that side of the hull.

Of course, these two principles can be combined in the case of a ship propelled by three screws, the two at each side having helical channels aided by the vortices that tend to be produced at each side of a relatively flat bottom portion and the middle screw being aided by a vortex produced by hull asymmetry.

Merely providing for the correct direction of rotation of the propellers and the correct direction of twist of the helical channels in accordance with the above principles is not in general sufficient to keep the towing resistance of the hull low enough so that the provision of the helical channels may provide a net saving in the energy required to drive the ship at its cruising speed. The additional reqirements, in general, relate to elements of shaping of the helical channel for each propeller and in the rate of change of hull cross-section in the after body of the hull. The first of these factors involves a design of a helical channel such that the water flow incident on the so-called propeller disc has a peripheral component opposed to the direction of movement of the propeller blades over at least two-thirds of the circumference, at least with respect to a zone of the propeller disc which includes the path of the portion of the propeller blades where the maximum thrust is developed. A design of the helical channel in accordance with the present invention makes it possible to reduce the ratio of the maximum to the minimum value of thrust developed by a propeller blade in one revolution to an amount smaller than 2 when the ship travels at its cruising speed.

An important feature found desirable is that the helical channel leading water to a propeller should merge into a clear annular space surrounding the propeller shaft shroud located ahead of the propeller. The merger of the helical channel at its aft-end into a clear annular space around the propeller shaft shroud is at a location where the channel profile or cross-section reaches substantial tangency to the aft-end of an external hull skin surface connecting the main portion of the hull to the propellet shaft shroud, thus forming a web that terminates where the clear annular space begins. It has been found by the present invention that in the line drawn in the athwartship plane passing through the web end, or annular space beginning, which line runs from the center of curvature of the portion of the shaft shroud surface tangent to a vertical line on the opposite side of the shaft shroud to the point of tangency of the helical channel and the external hull skin surface should run from that center of curvature either below the horizontal or at an upward angle not exceeding 40° and preferably not exceeding 35°, and desirably less than 30°, even if such a design results in bulging out the hull somewhat in the portion just ahead of what has been referred to as the end of the web between the external skin and the end portion of the helical channel. The effect of bringing the helical channel that far around has been found to have a favorable influence on the water flow configuration in the deeper part of the propeller disc, both in reducing risk of cavitation and in evening out the thrust over a propeller blade revolution, as particularly described in the description given below.

Furthermore, in order to reduce the towing resistance, it has been found important that the most concavely bent portion of the profile of the helical channel should in each case be near the point of tangency thereto of a line drawn from the center of curvature of the profile in the same athwartship vertical profile plane of the part of the propeller shroud root tangent to a vertical line, for all parts of the propeller shroud root having a profile passing through the vertical. The shroud root is defined as the proportion of the propeller shroud forward of the end of the helical channel termination which is not more than partially merged in the athwartship profile with the remainder of the hull. Also, the curvature of the most concavely bent portion of the profile of the helical channel should not decrease lengthwise of the channel towards the stern.

It has also been found that for any profile of the helical channel where there is a vertical line tangent to the shaft shroud root surface, the distance along a line drawn from the intersection of such a vertical line with the overlying surfaces of the helical channel to the center of curvature of the shroud root at the point of tangency with the vertical line, measured between the said intersection and the intersection of such line passing through the center of curvature with a lower surface of the helical channel which is also a surface of the propeller shroud root, should not be greater than the sum of the maximum diameter of the propeller hub or the minimum diameter of the shaft shroud, whichever is greater, and the radius dimension of the propeller. Also, if the profiles relating to different cross-sections of the helical channel are so displaced and/or turned in relation to each other that the concave parts make contact with each other but do not intersect, the concave part of a profile relating to a more forward portion of a channel would encompass all the concave parts of the tangent profile relating to a more aft portion of a helical channel.

Also, the radial clearance in the clear annular space surrounding the propeller shaft shroud aft of the end of the helical channel, between the shaft shroud and a concave portion of the hull spaced therefrom at the forward edge of the propeller hub should preferably not be less than the propeller blade length anywhere at such forward edge. In many cases it will be found favorable, for the propeller shaft running through each propeller shaft shroud associated to a helical channel for the line joining the centers of curvature of the inward vertical portions of the surface of the root of the shaft shroud to depart from the lay of the shaft.

The taper of the cross-sectional area of the hull towards the stern is of great importance for reduction of the towing resistance of the hull, which means also for reduction of the propulsion resistance of the hull. Certain relations have been found to be favorable in this regard, but since they are best expressed in mathematical symbols that have not yet been defined or introduced, they will be left for explanation below and not included in the present summary of the invention. Briefly, what has been found is that the proper cross-sectional area taper must be found by considering the propeller shaft shroud and shaft shroud root cross-sectional area as well as the immersed cross-sectional area of the remainder of the hull at each station under consideration. In other words, all the way to the propeller hub the propeller shroud cannot be considered as a mere appendage that does not participate in the aftwards taper of the hull for hydrodynamic purposes.

The effective "tailoring" of the portion of the ship's wake made possible by the method and the hull configuration features provided by the invention have the advantage that variations in the forces acting on the propeller are reduced to such an extent that there is no need for increasing the number of propeller blades above the usual minimum number of three and, on the contrary, it can actually be reduced to two in order to obtain additional improvement in propulsion efficiency without the usual price of an intolerable level of vibrations.

BRIEF DESCRIPTION OF THE DRAWINGS

The principle of the invention and embodiments, forms and further developments of the invention are described below in detail with reference to the accompanying drawings.

FIG. 4 is a representation corresponding to FIG. 2 for a twin screw ship with a helically or helicoidally shaped channel ("helical channel") for each propeller in the underbody of the ship.

FIG. 5 is a further example of a characteristic for the incident water flow to the propeller.

FIG. 6 is a diagrammatic representation of the stern part of a ship in accordance with one embodiment of the invention.

FIGS. 7 to 10 are diagrammatic cross-sections on parts of the ship's hull in accordance with FIG. 6.

FIGS. 17 and 21 show the right and left sides, respectively, of the afterbody of the hull of a single screw ship provided with the helical channel and a nozzle surrounding the propeller.

FIGS. 18 and 19, respectively, show vertical and horizontal cross-sections of a hull afterbody similar to that represented in FIGS. 17 and 21, except that no nozzle is provided around the propeller.

FIG. 20 is a partial set of cross-sections similar to those of FIG. 18, but for a hull provided with a nozzle and therefore corresponding to FIGS. 17 and 21.

Before explaining the invention and its embodiments, the conditions obtaining on one blade of a ship's propeller are firstly summarily reviewed and the terms "incident flow characteristic" and "isodyne" will be defined.

In investigating the interaction between the incident flow and the blade of a ship's propeller it is possible to make a limitation to that zone of the propeller blade, in which the mean thrust force reaches its maximum. This zone has the form of a circular sector band and its mean radius $r_q$ is generally between 0.7 and 0.8 times the propeller radius $r_m$. Since the radial velocity component (in relation to the propeller axis) of the incident flow only has a very slight influence on the operational behaviour of the propeller, it is furthermore possible to make a limitation to the axial component $V_a$ and the tangential or peripheral component $V_t$ of the incident flow in the propeller disc and to represent the conditions by the two-dimensional diagram in accordance with FIG. 1.

Figure 1:
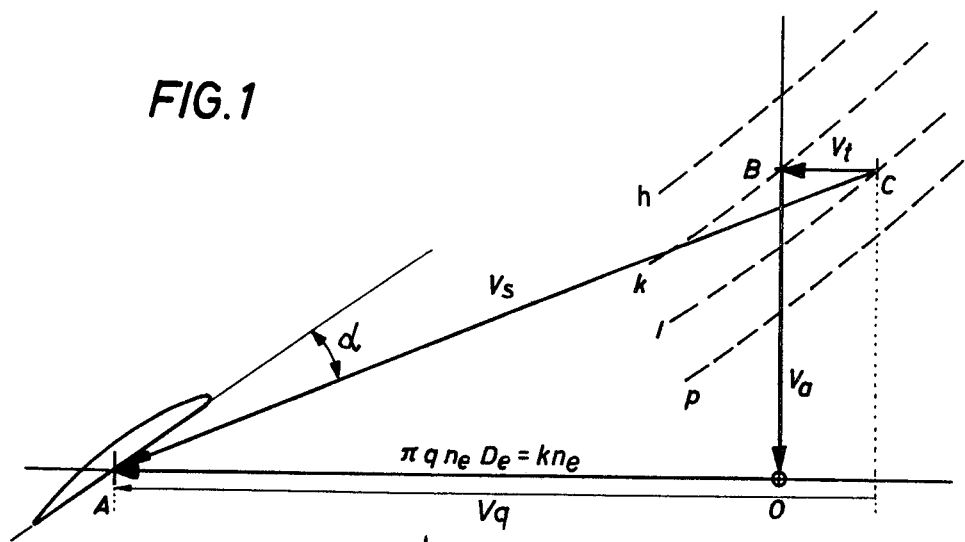
FIG. 1 is a graphic representation for explaining the incident flow to a ship's propeller blade.

In FIG. 1 the incident flow conditions for a certain angular setting of the propeller blade under consideration, to which correspond the illustrated angle of attack of the blade, are represented, in the case of which the consideration, as mentioned, is restricted to an annular zone on both sides of the radius $r_q$. In the case of the conditions assumed for example in FIG. 1 the axial component $V_a$ has the value represented by the vector arrow BO. The peripheral speed component related to the propeller blade, of the water can be broken down into two components having either the same or opposite directions, which are respectively represented by the vector arrows AO and BC. The first component AO is based on the speed of the propeller blade with respect to the ship's hull and hence is represented by $kn_e$, where $n_e$ denotes the number of propeller revolutions per unit of time and k is a constant for the particular radius $r_q$ expressed as a fraction q of the full propeller radius $R_e$ which is, in turn, half the propeller diameter $D_e$. The second component, represented by the vector arrow BC, is the mean value of the peripheral speed of the water flow $V_t$ relative to coordinate system moving with the hull, in the sector under consideration and in the zone under consideration of the propeller disc. The tangential component relative to the moving propeller blade is the sum $V_t + kn_e$ which may be designated $V_q$. The arrow CA is the resultant of vectors $V_a$ and $V_q$ and is the incident flow speed $V_s$ of the zone under consideration of the propeller blade, with the assumed angualr setting shown.

When the angular position of the propeller blade coming into consideration changes in the course of rotation of the propeller, because of variations in the water flow encountered, the point C at the end of the incident flow vector $V_s$ describes a closed curve for the zone, under consideration, of the propeller blade. An example of such a curve is shown in the FIG. 2 diagram. This curve will be termed in what follows the "incident flow characteristic" produced by the movement of the ship's hull under consideration for a certain propeller disc. Since the wake of a ship's hull forward of the propeller is not affected by the actual speed of rotation $n_e$ of the propeller basically, the incident flow characteristic is practically independent of the propeller speed of rotation.

If, on the other hand, the amount and the direction of the incident flow are changed with respect to the propeller blade under consideration (and therefore also the locus of the point (C) there is a change, even in the case of a constant speed of rotation of the propeller, of the thrust exerted by the zone of the blade considered and also of the force acting on the propeller blade as a whole. In the diagram in accordance with FIG. 1, it is possible to draw in a whole family of curves, along which respectively the point C can be displaced without in this respect the thrust changing as a whole which is exerted by the propeller blade coming into consideration. These curves represent different combinations of values of $V_q$ and $V_A$ producing the same amount of thrust. These curves, which are represented in FIG. 1 by the broken lines h, k, l and p, are referred to in what follows as "isodynes" of the propeller coming into consideration. The isodynes generally have a course as is indicated in FIG. 1, since on an increase in the angle of the incident flow angle $\alpha$ between the stream lines coming into consideration and the observed zone of the propeller blade for a pre-established thrust a smaller relative speed (corresponding to the vector arrow BC) of the propeller blade is required with respect to the incident flow and vice versa. The isodynes for a pre-established propeller can be computed on the basis of the theory of screw propellers or can also be determined empirically. For empirical determination it is generally sufficient to use general measurements performed on a free running propeller.

Instead of the isodynes explained (curves of the same thrust force in a predetermined propeller blade zone) it is also possible to use curves of constant thrust force for the whole propeller blade or also curves of constant torque on the propeller shaft. For the practical application of the invention it is however most convenient to use the isodynes explained, which relate to the thrust force of the whole propeller blade in a direction parallel to the axis of the propeller shaft.

Figure 2:
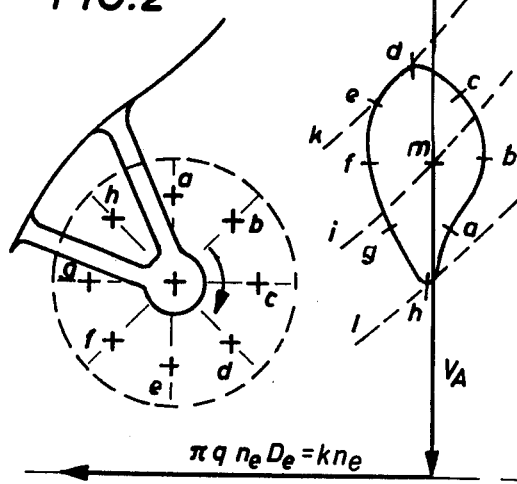
FIG. 2 is a graphical representation of a characteristic curve for the incident flow to a propeller in a hull configuration represented diagrammatically on the left, of a conventional twin screw ship.

An examination will now be made of the significance of the shape of the incident flow characteristic and its position with respect to the family of isodynes on the operational behaviour of a propeller with reference to FIGS. 2 to 5. In FIG. 2 on the right the incident flow characteristic is represented for an outwardly acting screw of a twin screw ship and three isodynes k, i and l are represented in a diagram corresponding to FIG. 1. The isodynes k and l form tangents of the incident flow characteristic. In the diagram of FIG. 2 furthermore a point m is indicated, whose ordinate plot indicates the value $V_A$, averaged out over the whole propeller circle, of the axial speed component $V_a$ of the incident flow. The abscissa value of the point m corresponds to the averaged value $V_T$ of the peripheral component $V_t$, though the latter in the case of conventional hull shapes is generally approximately zero. The isodyne i passing through the point m therefore corresponds substantially to the averaged value of the thrust force, which the propeller blade under consideration exerts during one complete revolution. On the left adjacent to the diagram explained, a part of the ship's skin and two struts (shaft supports) are represented for the propeller shaft and also the propeller disc is represented diagrammatically. The propeller disc is divided up, by three diametrically running broken lines, into eight sectors. The ends of the diametrical lines are denoted by the letters a to h, which therefore correspond to eight angular positions, in its revolution cycle, of the propeller blade under consideration, to which the points, denoted by the same letters, of the incident flow characteristic correspond.

The portion of figure at the left is merely to identify the eight parts of the propeller disc represented by the letters a to h in the characteristic curve drawn at the right of a graph of $V_s$ in which the coordinates are $V_q$ and $V_a$. If the minimum, the maximum and the mean values of the thrust exerted by the propeller blade at a given speed $n_e$ are denoted by $T_k$, $T_l$ and $T_i$ respectively, in accordance with the isodynes k, l and i respectively, the ratio $T_l/T_k$ represents an indication of the thrust variations, which occur in the case of the conventional twin screw ship taken into consideration during one propeller revolution. These variations in thrust have in the case of the ships mentioned substantial values. The difference $(T_l-T_k)$ is an indication for the amplitude of the thrust variations. In the case of conventional twin screw ships generally each isodyne intersects the incident flow characteristic between the isodynes k and l in two points, and the frequency of the thrust variations is therefore equal to the product of the speed of rotation and the number of blades.

Figure 3:
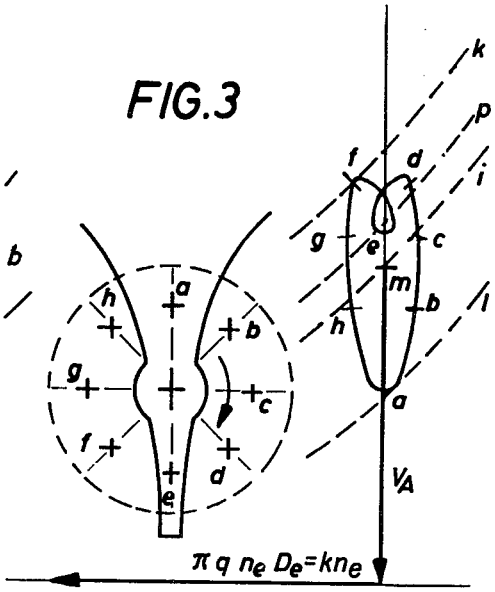
FIG. 3 is a representation corresponding to FIG. 2 for a conventional single propeller ship ("single screw ship").

FIG. 3 shows the corresponding conditions for a single screw ship with a conventional hull shape. In comparison with FIG. 2 it is only to be remarked that the point m owing to the symmetrical position of the propeller in the wake field lies precisely on the ordinate and the incident flow characteristic is symmetrical with respect to the middle of the ship as long as the screw axis is not oblique with respect to the middle of the ship. The diagram in accordance with FIG. 3 furthermore comprises isodynes, for example the isodyne p, which intersect the incident flow characteristic at four points. This corresponds to thrust variations, whose frequency is twice as high as the frequency occurring in a zone in which the isodynes only intersect the incident flow characteristic at two points.

FIG. 4 shows the relationships for a twin screw ship, whose hull has in the stern zone a helical channel for each propeller. The partial hull cross-section shown at the left in FIG. 4 corresponds to that position where the wall of the helical channel meets the part, not belonging to the helical channel system, of the outer skin of the hull and the two wall zones begin to intersect. In the propeller disc of FIG. 4, as is also the case with FIGS.

2 and 3, eight radii are drawn in, which correspond to different angular positions, as it revolves, of a propeller blade under consideration. The crosses denoted by a to h represent the loci, where the axial and peripheral components of the incident flow are measured, on the basis of which the incident flow characteristic of FIG. 4 has been drawn. The point m in the interior of the incident flow characteristic represented in FIG. 4 corresponds to the end of the vector, which is made up of the mean axial component $V_A$ and the mean peripheral component $V_T$ of the speed of the water flow (incident flow) in the propeller disc as a whole. The vector of the mean peripheral speed is in this case owing to the vortex flow produced by the hull and helical channel not equal to zero.

The point m lies on the isodyne i for the mean value of the thrust, which is produced by the propeller blade under consideration. The isodynes k and l, which represent the tangents to the incident flow characteristic, correspond again to the minimum and maximum values respectively of the thrust exerted by the propeller blade under consideration.

FIG. 4 illustrates a characteristic curve in which the peripheral speed components $V_t$ of the incident flow occurring in the propeller circle are opposite for at least two thirds of the whole revolution of the propeller to the direction of movement of the propeller blade. The peripheral speeds of the incident flow in this case furthermore ensure that the ratio of the maximum value to the minimum value of the thrust, which is exerted by the individual blade of the propeller coming into consideration during a whole revolution on the propeller axis, is less than 2, when the ship is travelling at crusing speed. Such a result is one of the objectives of the method of hull design of the present invention.

FIG. 5 shows a different incident flow characteristic for a ship's hull with a helical channel. The incident flow characteristic is, however, not a curve free of intersections and instead has two intersections or nodes. In this case the isodyne i, which passes through the point m (which has the same meaning as in the case of the preceding figures), intersects the incident flow characteristic in six points. The isodyne k is tangent to the incident flow characteristic in two points and the isodyne l is tangent to the incident flow characteristic at three points. This very special case of an incident flow characteristic is intended to show that, and in what manner, the isodynes can intersect or make contact with an incident flow characteristic in more than two points.

The incident flow characteristic represented in FIG. 5 has positions of the same incident flow components directed in the opposite direction to the direction of the propeller, and which correspond to the positions of the propeller blades, which are removed by at least one quarter (that is to say at least $\pi/2$) of a full revolution of the propeller. This means that in sections of the incident flow characteristic, which belong to quadrants lying symmetrically with respect to the axis of the revolution of the propeller, the incident flow components will in parts have the same values, at which the peripheral speed component $V_t$ has a direction opposite to that of propeller rotation.

In the case of a peculiar shape of the ship shown in FIG. 5, the maximum thrust, which is exerted by a propeller blade on the propeller axis, in the case of a downward directed position of the respective propeller blade, is greater than in the case of an opposite upwardly directed position of this propeller blade, as may be seen from the sectors a–b and e–f of the diagram given in FIG. 5.

Owing to this feature, which can exclusively be attained by the shaping of the helical channel in accordance with this invention, it is possible to ensure that the maximum thrust which is exerted on the propeller shaft by the individual propeller blades when moving through the upward direction quadrant of the propeller disc is smaller than the maximum value of the thrust exerted by the same propeller blades moving through the lower half of the propeller disc at the same speed, so that the cavitation starts to occur at the same time with a certain evenness in many distant sectors of the propeller disc.

A helical channel is to be taken to mean a channel which runs along the lower side of the ship's hull and is generally open downwards and which can impart to the water a macroscopic vortex flow and whose walls in a first approximation generally form the shape of parts of the surface of a circular cylinder or a very slender cone with an axis which is deformed helically. Such surfaces are possessed for example by the shells of so-called "tower snails." As already mentioned, a helical channel to produce a vortex in the water presented to the propeller rotating in a direction opposite to the propeller is a device that has long been known, but such channels have heretofore produced too little improvement to justify their construction and have sometimes produced no improvement or even a deterioration of propulsion efficiency.

The present invention is intended to produce an evening of the thrust exerted by the propeller blades during one revolution by a suitable shaping of the helical channel, the propeller shaft shrouds and possibly also by shaping other parts of the ship's skin which affect the wake in the propeller zone. It is generally sufficient if the ratio of the maximum thrust value to the minimum thrust value (corresponding to the isodynes l and k) is reduced to a value below 2, since the improvement which can be produced by a further reduction in thrust variations, in the propulsion efficiency generally, could not justify the necessary complexity.

The maximum and minimum thrust values can be found from an isodyne diagram for one particular propeller blade, which can be measured for the ship itself or for a test model in a measuring tank at the speeds and drive at towing forces under conditions, which correspond to the conditions obtaining in the case of an actual ship driven by its engine. The two extreme values of the overall thrust are determined by the two isodynes of the ship's propeller blade which are tangent to the incident flow characteristic of the respective ship, which can be measured experimentally in a model tank test for a representative number of points with reasonable accuracy by methods mentioned further below. There are, however, many variables in obtaining a favorable incident flow pattern. In the case of FIG. 4 it is for example only necessary to incline the ship's propeller shaft by a few degrees towards the plane of symmetry of the hull within the sector between the radii c and d in order to achieve such a deformation of the incident flow characteristic of the ship's propeller as reduces the ratio between the maximum and minimum thrust values in accordance with the isodynes k and l to a substantial extent and which leads to the force variations acting on the ship's propeller blades being substantially reduced. This is highly desirable, even if as a result no substantial saving in engine power is achieved. A similar change in the incident flow characteristic can be achieved even without any change in the position of the ship's propeller shaft if both the shape of the helical channel and the shaft shroud is changed together with their position with respect to the ship's hull. In this respect further considerations will be presented below.

Owing to the smaller range of the family of the isodynes intersecting the incident flow characteristic, firstly, intersections in the incident flow characteristic occur which lead to many isodynes intersecting the incident flow characteristic at more than two points and furthermore, outside the zone of these isodynes, generally two lateral groups of isodynes remain, which intersect the incident flow characteristic at only two points. The reason for this is that the reduction of the amplitude of the disturbances in the basic frequency (speed of rotation of the ship's propeller times the number of blades of the ship's propeller) in the wake is generally not accompanied by corresponding reduction in the amplitude of harmonics (amplitude of disturbances, whose frequency represents harmonics on the basic frequency), since these are due to zones and parts of the ship's hull, of the helical channels and the shaft shroud, which would either be very difficult or inexpedient to modify. On the other hand, it is also possible to arrive at conditions at which the amplitude of the thrust variations which correspond to the group of isodynes which intersect the incident flow characteristic at more than two points is larger than that of the thrust variations, which correspond to the group of all isodynes, which intersect the incident flow characteristic at two points at the most. When such conditions have been obtained, it becomes questionable whether a further compression of the thrust range of the incident flow characteristic with respect to the saving in power and the reduction in thrust variations can still be expedient, since the amplitude of the variations in the basic frequency is now smaller than the amplitude of variations in the harmonic frequencies. It can now be more expedient to increase the size of the surface of the ship's propeller blades and simultaneously to reduce their number. If necessary it may also be possible to change the shape of the channel system to such an extent that the incident flow characteristic is compressed to such an extent that no isodynes intersect the incident flow characteristic at two and only two points. Such a case is represented in FIG. 5 already mentioned. In this case the isodyne i, which passes through the point m corresponding to the mean axial speed component $V_A$ and the mean tangential speed component $V_T$ of the incident flow taken into consideration as a whole for the ship's propeller, cuts the incident flow characteristic at more than two points. This constitutes an indication that a further compression of the incident flow characteristic will probably not be expedient.

In the case of a conventionally shaped ship's hull only the thrust and the speed of rotation of the propeller are taken into consideration, while the mean tangential component $V_T$ of the water stream entering the propeller disc is regarded as negligible. In what follows it is therefore intended to indicate how in the case of a ship's hull with a helical channel the mean longitudinal speed component $V_A$ and the mean tangential speed component $V_T$ of the incident flow, averaged out over the whole ship's propeller disc, are to be dimensioned. The peripheral speed component $V_T$ averaged out over the ship's propeller disc is, in the case of the subject matter of the application, not negligible but it is instead used to bring about a substantial influence on the engine power, since the macroscopic vortex flow produced by the shape of the channel system is used for bringing about the compensation of the rotational stream or flow brought about by the ship's propeller. The correct dimensioning of the two speed components therefore constitutes a substantial feature of the present invention.

The methods preferred for checking the distribution of longitudinal speed component and tangential speed component of flow entering the propeller disc so as to optimize the shape of the afterbody of a ship's hull in accordance with the method of the invention will be further discussed after an explanation of the configurations that have been found favorable as the result of use of the method of the invention.

In the course of numerous model tests it has been found that the efficiency of propulsion close to a value $V_{To}$ of the peripheral component, averaged out over the propeller circle, of the speed of the incident flow attains a maximum which is represented by the following equation:

$$V_{To} = 0.5 \frac{g}{\pi q} \frac{q}{\delta} \frac{M_e}{D_e^3 V_A} \tag{1}$$

In this respect $M_e$ denotes the average or mean value of the torque transmitted, by the propeller shaft in one rotation, to the propeller coming into consideration, $D_e$ represents the diameter of the propeller circle, $V_A$ represents the average value of the axial speed component of the incident flow, g denotes the acceleration due to gravity and $\delta$ denotes the specific weight of water and q denotes the ratio of the radius $r_q$ of the zone coming into consideration of maximum thrust action to the radius of the propeller disc. The optimum value of the efficiency of propulsion for a certain speed of the ship lies within a not excessively narrow interval, in which the efficiency of propulsion undergoes relatively few changes in the case of changes of $V_T$; outside this interval the efficiency of propulsion then however drops very rapidly. On the basis of a number of practical and theoretical considerations it is possible on this basis to specify for the most favorable value of $V_T$ a lower limit $V_{Tm}$ and an upper limit $V_{TM}$, which are indicated by the following equations:

$$V_{TM} = 0.9 \frac{g}{\pi q} \frac{q}{\delta} \frac{M_e}{D_e^3 V_A} \tag{2}$$

$$V_{TM} = 0.3 \frac{g}{\pi q} \frac{q}{\delta} \frac{e}{D_e^3 V_A} \tag{3}$$

In the range of speeds of progression which is relevant chiefly for the ship under consideration, therefore the value of the peripheral speed component $V_T$ averaged out over the propeller disc should lie within these limits.

The measures mentioned so far can be realized by using conventional techniques known in naval architecture in conjunction with the principles given in the initially mentioned publications relating to ships with helical channels. The mean peripheral speed component $V_T$ at the radial distance $r_q$, at which the thrust on average (over one rotation) has its maximum value, can be determined for example by measuring the speed of rotation of the ship's propellers with the same speed of movement of the hull and the same thrust in the one case with the propellers turning towards the inside and in the other case with them turning towards the outside. Half the difference of the speed of rotation multiplied by the factor $\pi q D_e$ gives the mean value of the peripheral component $V_T$ of the instant flow of the propeller considered. The longitudinal speed component $V_A$ of the incident flow can be measured in a conventional manner, an operating speed of rotation being selected in this case which is equal to the mean value of the speeds of rotation with the propellers turning towards the inside and turning towards the outside.

In what follows further considerations will be provided as regards the principles of construction with which the aim forming the basis of the invention can be attained.

FIG. 6 is a diagrammatic side view of the afterbody of a twin screw ship according to the invention. The rudder is not shown in order to simplify the drawing. The symbols have the following meanings:

L-L: design water line
$S_{op}$-$S_{mp}$: base
M-M-M-M: middle of ship
J-J-J: lower limit of shaft shroud and its root
$s_1$: ordinate station, aft end of shaft shroud
$s_2$: ordinate station, aft end of helical portion of the channel system (aft end of shaft shroud root)
$s_3,s_4$: other ordinate stations
R: shaft shroud
E: propeller
Q-Q-Q: limiting line between the wall of the helical channel and the outer skin of the hull
U-U-U: upper limit of helical channel In the side view the limit of the helical channel and the sections through the outer skin at the middle of the ship are represented in broken lines, where they run in the side view shown behind the shaft shroud or the outer skin of the ship's hull. Point $s_{mp}$ of the base corresponds to the position of the main section, this term being to be understood to mean the section with the maximum cross-sectional area below the design water line or, if the ship has a central hull part with a constant maximum immersed cross-sectional area, it means the section closest to the stern, with that maximum immersed cross-sectional area.

FIG. 6 furthermore shows an optional Kort nozzle K in dot-dash lines and in section.

The FIGS. 7 to 10 are diagrammatic cross-sectional views of parts of this ship's hull in accordance with FIG. 6 at the respective stations $s_1$, $s_2$, $s_3$ and $s_4$. FIG. 7 is a cross-section at the position $s_1$ and shows that the Kort nozzle is partly formed by a wall section QUM of the stern outlet of the channel system belonging to the helical channel. M is a point at the middle of the ship (the vertical plane of symmetry, passing through the keel, of the ship), while the line L-Q represents a part, not belonging to the channel system, of the outer skin of the ship. The propeller E turns in the direction of the arrow. The distance between the part merging with the propeller hub, of the shaft shroud and the wall section QU of the channel system belonging to the helical channel is denoted by $\lambda$.

The position $s_1$ practically represents the stern end of the channel system belonging to the helical channel and the beginning of its following annular space ahead of the starboard propeller of the ship. The channel system and the shaft shroud and shroud root R merge on the bow side gradually with a normal hull shape and finally disappear completely. It can be seen from FIG. 6 that the shaft shroud R between the positions $s_1$ and $s_2$ (as distinguished from the shroud root between $s_2$ and $s_3$) is separated from the hull proper and that an annular zone around the shaft shroud, within the optional Kort nozzle represented in FIG. 7, is filled with water; this zone is delimited by the concave wall Q-U of the channel system, and optionally by the Kort nozzle K which closes the circle. The part, lying between the positions $s_1$ and $s_2$, of the channel system is therefore termed "annular channel," although this is only strictly accurate for that part of the channel which is closed by the Kort nozzle when one is provided. It is to be mentioned here that the Kort nozzle, which surrounds the propeller, is not absolutely essential. Without the Kort nozzle the "annular channel" is therefore only partly delimited by parts of the skin of the ship and is not closed by a complete outer ring and could therefore be more properly referred to as an "annular space."

In FIG. 8 a cross-section at the position $s_2$ is represented where the shaft shroud R merges with the shroud root bulge of the hull. Here the above-defined "annular channel" terminates and the helical channel, still delimited by the hull, which is continued further towards the bow, begins. The cross-section at the position $s_2$ has a particular form; the concave section line Q-U, which delimits the helical channel, is thus continued as far as a point T, where the actual shaft shroud outline begins, which forms a convex curve T-V-J. The whole S-shaped line U-Q-T-V makes contact at point Q with the line L-Q-J which represents the outline (sectional line) of the outer skin of the ship's hull, which ends at point J and at this position merges with the mantle wall T-V-J. On considering the hull from the side (FIG. 6) the point Q represented in FIG. 8 lies on the limit Q-Q-Q between the concave part of the "annular channel" QU and the part, not belonging to the helical channel, L-Q of the outer skin of the hull. The lower part of the edge, represented in FIG. 6, Q-Q-Q forms a rib or web on the shaft shroud, which terminates at point Q in FIG. 8. The closed curve Q-T-V-J-Q in FIG. 8 can be considered the connection of the shaft shroud with the hull properly so called. At the point J the above-mentioned closed curve touches a horizontal straight line J-N, that is to say the wall of the shaft shroud runs horizontally here as seen in section, while the bottom of the shaft shroud, as seen from the side, has the course corresponding to the line J-J-J in FIG. 6. The point V of the above-mentioned closed curve constitutes the point of contact of this curve with a vertical straight line V-Z and the part T-V-J of the closed curve corresponds to the outline of the shaft shroud, which is directed towards the interior of the helical channel and runs vertically at the point V.

The vertical straight line V-Z intersects the outer skin of the hull at the point Z, which lies in the concave upper part Q-U-Z-M of the wall of the helical channel. In FIG. 8 reference letter R denotes the center of curvature of the shaft shroud outline at the point V, where the shaft shroud outline, as seen in section, makes contact with the vertical straight line V-Z. The center R of the curvature is conventionally termed the "center of the shaft shroud" and this center of the shaft shroud can be defined in a suitable manner also for the other cross-sections of the shaft shroud, which between the positions $s_1$ and $s_2$ form a closed curve. In FIG. 8 furthermore a straight broken line R-Q is inserted, which connects the shaft shroud center R with the point Q, where the concave part T-Q-U-Z of the wall of the helical channel makes contact with the part L-Q-J, not belonging to the helical channel, of the outer skin of the ship's hull. Generally the part L-Q-J of the outer skin of the hull can be concave or convex at this position. The position of the straight line R-Q is important for the present invention, as will be explained below.

In FIG. 8 the point Z, where the vertical straight line V-Z intersects the inner concave part Q-U-Z-M of the wall of the helical channel, furthermore connected by a straight line R-T-Z with the shaft shroud center R. This straight line intersects the outline of the shaft shroud at the point T, whose position with respect to the point Z is also important for the invention.

The surface or area within the closed line, which is formed by the concave part Q-U-Z of the wall of the helical channel, the concave and convex part Q-T-V of the shaft shroud wall and the vertical straight line V-Z, is denoted in what follows by the symbol X and is termed the "area of the effective cross-section of the helical channel." The surface or area within the closed line, which is formed by the vertical straight line V-Z, the part Z-M of the wall of the helical channel and the vertical straight line M-N, corresponding to the middle of the ship, and the horizontal straight line N-J and also the convex part S-J of the shaft shroud wall, is denoted by the symbol Y. The sum of the areas X and Y is denoted by the symbol $\phi$ (s) and termed "overall area of the channel cross-section," it thus corresponding to the area within the whole closed curve J-V-T-Q-U-Z-M-N-J. If in particular cases the substantially concave upper part of the wall of the helical channel should extend between the shaft shroud and the middle of the ship downwards to such an extent that it intersects the horizontal straight line J-N, this point of intersection would be denoted by "M" and the vertical straight line M-N would in this case not be present. There would however in principle be no change as regards the definition of the areas or surfaces X and Y.

Figure 9:
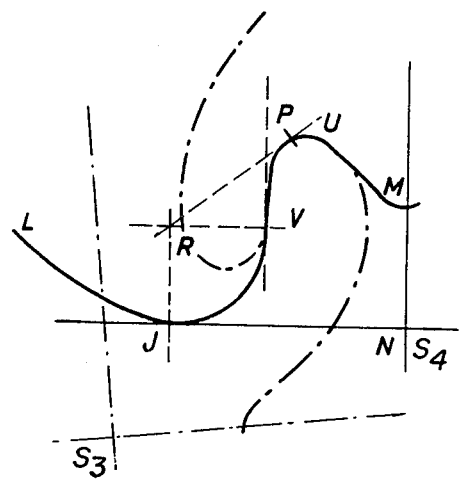

FIG. 9 shows, by a solid curve, the outline or profile of the channel system at that position, designated s4 in FIG. 6, where the actual helical channel merges with an extension passing towards the bows, this extension being similar to a normal bottom or keel channel. The position of this point of transition is defined by that cross-section at which the vertical straight line V-Z (FIG. 8) is shrunk together to be a single point. At this position the limitation of the channel consists now only of the line L-J-V-U-M (these letters have in this respect the same meanings as in the preceding figures), while the part V-T-U-Z has completely disappeared. The above-defined effective cross-sectional area of the helical channel X has been reduced to zero and the area Y is now equal to the overall area $\phi$ (s) of the channel cross-section. Interpunctuated broken lines (dot-dash lines) in FIG. 9 show the solid lines of FIG. 10 rotated and shifted so that the concave parts of the channel profiles touch but do not intersect.

Starting at that position where the channel has the cross-section represented in FIG. 9, and passing towards the end on the bows end of the channel the latter is therefore practically not to be distinguished from a normal bottom or keel channel, even though the channel in this part can extend in particular cases to the side of the ship's hull and can divide along the middle of the ship. In this case as well, the overall area of the channel cross-section is still defined by the convex line corresponding to the section through the part, extending towards the bows and outlining the channel, of the ship's skin, the horizontal straight line which is tangent to the lowest part of the skin of the ship in this cross-section, and the concave outline of the channel wall. The limitation of this area or surface is terminated either at that position where the horizontal straight line, tangent to the lowest point of the skin of the ship, intersects the concave part of the channel wall or at points where the vertical straight line corresponding to the middle of the ship intersects both the wall of the channel system and also the horizontal straight line, which is tangent to the convex lower part of the skin of the ship.

Figure 10:
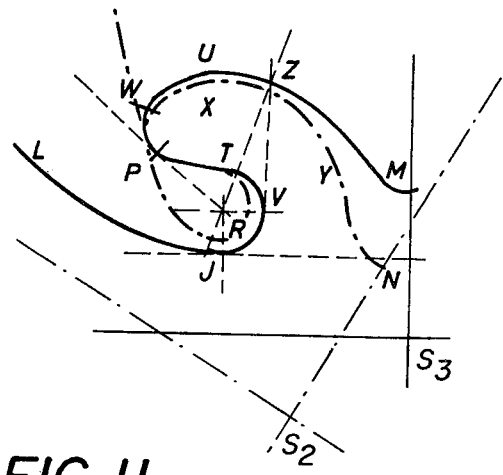

FIG. 10 shows in solid lines the cross-sectional outline of the helical channel at the designated s3 in FIG. 6, and in interpunctuated lines the profile and axes of FIG. 8 rotated in the same manner as FIG. 10 was rotated for superposition on FIG. 9. The letters again have the same meanings as previously and the respective sections have the properties explained with reference to FIGS. 8 and 9. Only the point Q is missing on the solid-line profile and furthermore in the concave part of the wall of the helical channel two additional points P and W have been inserted. The point W is the center of the concave part T-P-W-U-Z and along the curved intersecting line has the same distances from the points T and Z. The point P is the point of contact between the curved section or cutting line and a tangent applied to them, which passes through the center R of the shaft shroud. In the course of the transition of the helical channel with the keel channel there is a position where the four points T, P, W and Z coincide, where the point U lies between the points Z and M and where the effective cross-sectional area X of the helical channel has not yet become zero. For that part of the channel, which lies on the bows side of this position, the following observations do not apply as regards the points T, P and W, and this part on the bows side is in this respect not important for the invention.

The subject matter of the invention which is now to be explained with reference to the FIGS. 6 to 10 differs from the prior art both qualitatively and quantitatively. As regards qualitative features, in respect of which the subject matter of the invention differs further from the prior art, one can firstly mention the shaping of the concave part of the wall of the helical channel in such a manner that the zone of maximum curvature lies at least partly between the points P and W represented in FIG. 10, whose position has been defined above. The second qualitative feature resides in that the concave part of the wall of the helical channel has a particular course imparted to it, which can be described in the following terms: If the helical channel cross-sections are laid on top of one another in accordance with particular positions and they are so displaced and/or turned in relation to each other, as shown in FIGS. 9 and 10 for stations s3, s4 and s2, s3 respectively, that the concave parts of the section lines representing the wall make contact with each other but do not intersect, the whole concave wall part of the helical channel section for a particular position (s1, s2, etc.) along the base should encompass all concave parts of the sections in accordance with the positions which lie at the stern side of the outline or profile in consideration without intersecting or cutting it and the concave part of the cross-section under consideration is to be encompassed in a corresponding manner by the concave parts of all helical channel cross-sections corresponding to positions which lie on the bows side of the cross-section taken into consideration. Furthermore, at least two certain points, at which the above-mentioned concave wall parts of the channel cross-sections make contact, should lie in those curve zones, where the curvature has its greatest values, as also appears in the superposition shown in FIGS. 9 and 10. The maximum value of the curvature should further not decrease in the direction extending from the bows to the stern, which is again the case in the superposition illustrated in FIGS. 9 and 10.

These measures serve for bringing about a hydrodynamic effect on the incident flow and have the purpose of distributing the tangential or peripheral component of the incident flow within the propeller disc of the respective channel in such a manner that the peripheral speed, which is produced by the different sections of the propeller blades at different radical distances from the propeller axis is compensated to the maximum possible extent without as a result the axial component of the incident flow being excessively reduced, something which would involve an undesired increase in the towing resistance of the hull of the ship.

The quantitative features include as a first feature a certain dimensioning of the helical channel and of the annular channel with respect to the dimensions and properties of the respective ship's propeller.

The first quantitative rule of dimensioning resides in that the distance between the points T and Z, defined with reference to FIGS. 8 and 10, must not be greater than the propeller radius plus the maximum diameter of the propeller hub or the mininum diameter of the shaft shroud (whichever of these two is greater).

The distance between the concave part of the wall of the annular channel and the convex part of the wall of the shaft shroud in the cross-section passing through the stern end of the shaft shroud may further in no circumstances be less than the length of the blades of the propeller.

The position of the helical channel with respect to the hull of the ship is furthermore to be so selected that the rotating incident flow has an advantageous incident flow characteristic with respect to the isodynes of the propeller. In this respect the zone of the incident flow, in which the longitudinal component has its minimum shall lie in the propeller disc to the side of the propeller hub, that is to say this part of the incident flow has to be neither too far above nor too far below a horizontal straight line passing through the axis of the propeller. This can be ensured by giving the helical channel such a shape that the straight line R-Q, which was defined on the basis of FIG. 8, forms with the horizontal line an angle which is so small as is permissible with respect to the permitted length of the whole channel and the breadth of the hull in its relationship to the propeller. It is, however, generally sufficient if the angle of the straight lines R-Q and the horizontal line is less than 40°, preferably less then 35° and even less than 30°, and in this respect it is of no importance whether point Q lies below (i.e., the angle is negative) or above the horizontal line drawn through the center of the shaft shroud at the stern end of the helical channel, where the concave part of the wall of the helical channel begins to meet the outer skin of the hull. The angle may go negative as far as 50° or even 60°.

The dimensions and the position of the helical channel and of the shaft shroud with respect to the hull are however not only determined by hydrodynamic conditions or considerations, since as will be understood also the position of the propeller shaft must be taken into consideration, which again depends on the arrangement of the engine in the interior of the hull. It is naturally desirable for the loss in useful space, due to the presence of the channel system, in the ship to be as small as possible and this applies more especially from that part of the ship where the helical channel, as seen from the interior of the hull, encompasses the screw shaft of the ship, since it is wound about the shaft shroud. The most convenient method of keeping the losses of useful space as low as possible resides in arranging the wall part of the helical channel, which is located between the zones of maximum wall curvature and the shaft shroud, as close as possible to the propeller shaft. The distance between the propeller shaft and the walls surrounding it is conveniently made as small as is possible attention being paid to the construction of the hull and the shaft bearings in this respect. In this respect it is also necessary to take into account that the distance of the propeller shaft from the wall of the shaft shroud or, respectively, of the channel can initially increase owing to the course, which is generally not straight, of the shaft shroud and can then however decrease again.

As regards the dimensions of the propeller, which is located at the stern end of the shaft shroud, it is sufficient if at certain positions the free space between the propeller shaft and the inner wall of the shaft shroud, which forms the outer skin of the ship opposite to the helical channel, is not greater than the maximum diameter of the propeller hub or the diameter of the end of the particular shaft shroud.

If the intermediate space between the propeller shaft and the walls of the channel system is dimensioned in this manner, it will be possible, between the walls of the channel system and the parts, not belonging to the channel walls, of the wall of the hull, to provide a free space, in which parts of the engine can be accommodated. The engine and the hatch on the bows side of the engine room can in consequence be arranged comparatively close to the stern. The free space between the propeller shaft and the wall, opposite to the channel system, of the hull can be made use of in various different manners and it is possible for example to arrange a part of the engines or engine, such as the step-down transmission, within the root of the shaft shroud, towards the bows between the wall of the helical channel and the outer wall of the hull. In other cases it can be more convenient owing to the size of the step-down gearing or transmission to lengthen the propeller shaft and arrange it to extend past a part of the engine, which is arranged between the propeller shaft and the hull wall not belonging to the channel system. The step-down transmission is therefore on the bows side with respect to the above-mentioned part of the engine, which on the bows side of the step-down transmission can comprise still further units.

Figure 11:
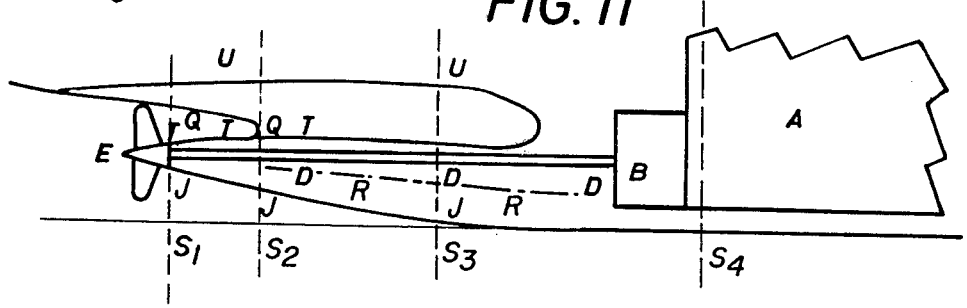
FIGS. 11 and 12 show a partly sectioned side view of ship's hulls in accordance with embodiments of the invention, in which the arrangement of the driving unit is represented.
Figure 12:
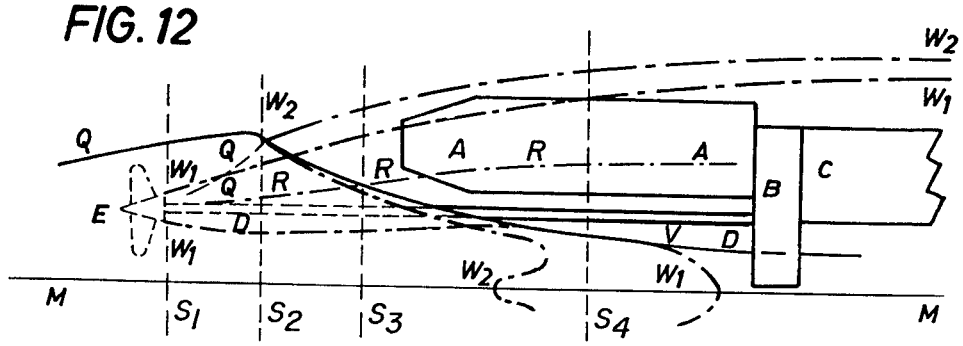

Two embodiments, not intended to limit the invention, of such arrangements with a satisfactory employment of the space available are represented diagrammatically in FIGS. 11 and 12.

FIG. 11 shows a diagrammatic side view of the stern part of the hull of the ship showing the location of propeller shaft and engine. The letters already used have the same meaning as in FIGS. 6 to 10. The propeller E is connected via a shaft D-D-D with a step-down transmission and/or a clutch B, with which one engine unit A is connected. It can be seen that the propeller shaft D-D runs close to the line T-T-T, which represents the upper limit of the shaft shroud and shroud root and that the engine unit A together with the unit B, which can comprise a step-down transmission and/or a coupling and possibly a thrust bearing, is arranged between the helical wall portion of channel system and the outer skin of the hull.

In the case of another embodiment shown diagrammatically in FIG. 12 in which the interior of the hull is represented from above, two different lines, $W_1$ and $W_2$, are shown, defining sections parallel to the waterline. $W_1$ passes through the middle of the propeller and $W_2$ passes through the point at which the helical channel at its stern end merges into a clear annular space around the propeller shroud. The line Q-Q-Q shows that partway aft from station $S_2$ towards $S_1$, there is a ridge on the propeller shroud fairing the helical channel into this clear annular space.

The unit B can again comprise a transmission and possibly a clutch and/or a thrust bearing and it is connected in this case with two engine sets A and C. It can be seen from this figure that the propeller shaft D-D can run very close to the wall of the shaft shroud. The unit B is located at the bows side end of the macine set A, which extends parallel to the propeller shaft. The unit is arranged between the helical wall portion of the channel system and the outer wall, not belonging to the system, of the hull.

In the case of all arrangements represented the helical channel comprises zones where the outer skin of the hull, irrespectively whether it belongs to the shaft shroud or the channel system, has a spacing from the propeller shaft, which can be smaller than the maximum diameter of the propeller hub or the minimum diameter of the shaft shroud. On the one hand, this feature ensures optimum use being made of the interior space of the hull and, on the other hand, as regards the pitch of the volute-like part of the helical channel it is necessary that the pitch be determined by certain specific conditions, which depend on the propeller and do not directly depend on the stern part, connected with the channel system, of the ship. If one defines the pitch of the helical channel by the increase in the above-defined effective channel cross-section X and if one considers its increase as a function of the longitudinal spacing s of the position, in which the effective cross-section has been measured, from a fixed reference point, then the minimum of the absolute amount of the first derivative $$\left| \frac{dX(s)}{ds} \right|_{s_2}$$

at the position of the stern end of the helical channel, where the effective cross-section X has its maximum value, is defined by the following formula $$\Lambda \frac{V_{Tm}}{V_A} \leq \left| \frac{dX(s)}{ds} \right|_{s_2} \tag{4}$$

The symbols $V_{TM}$ and $V_A$ have the same meaning as above, and the symbol $\Lambda$ denotes the minimum distance between the concave wall of the annular channel and the convex part of the shaft shroud of the helical channel under consideration; this minimum distance $\Lambda$ is in this respect measured at the stern end of the shaft shroud and of the helical channel; in the case of the distance $\Lambda$ it is therefore a question of the same distance or spacing as is shown in FIG. 7.

Therefore, an upper limit arises for the absolute value of the first derivative of the effective cross-sectional area or surface at the same position and this upper limit is defined by the following formula:

$$\left| \frac{dX(s)}{ds} \right|_{s_2} \leq \Lambda \left( 2 \frac{V_{TM}}{V_A} + C_t \right) \tag{5}$$

In this formula $C_t$ is a constant whose value is equal to the cotangent of the angle between the outer skin of the hull and the plane of section, measured at that point, where the outer wall at the stern end of the helical channel and at the beginning of the annular channel for the first time meets with the inner wall of the helical channel. The other symbols have the same meaning as previously. The limitations relating to the pitch of the helical channel at its stern end also are relevant for the dimensions of the whole channel system and its extension towards the bows, since the change and the amount of the area of the overall cross-section $\phi(s)$ cannot be completely arbitary and must have a trend running within narrow limits so that the production of the rotating incident flow does not have to be attained at the sacrifice of an excessive increase in the towing resistance of the hull. No zones should be present, for example in the interior of the channel system, where the flow becomes detached from the wall when the maximum speed of progression is achieved for which the ship is designed. The absolute value $$\left| \frac{d\phi(s)}{ds} \right|$$

of the first derivative of the overall cross-section of the channel as a function of the distance s of the cross-sectional plane from a predetermined reference point should therefore to decrease as evenly as possible from the stern towards the bows. It is best when the function $\phi(s)$ has a trend which can be expressed by a formula of the type $$\phi(s) = A(s_{oc} - s)^n \tag{6}$$

in which case A is a constant, $s_{oc}$ is the position of the cross-sectional plane in accordance with the bows end of the channel system, and n is a positive number which does not have to be a whole number, but must be smaller than 3. The length of the channel system extending in the direction towards the bows may naturally not be too large for the dimensions and the purpose of the ship. On the other hand, the exponent n cannot be made much smaller than 1.5, since otherwise the cross-sectional area would change excessively quickly and excessive transverse acceleration would occur in the water flow. In order to shorten the length of the channel system, it can be necessary to increase the value $$\left| \frac{d\phi(s)}{ds} \right|$$

along the stern section of the helical channel towards the bows to a slight extent so that the decrease in area begins at a section lying more towards the bows of the channel system, for example in a section which corresponds to the bottom channel. This is represented graphically in the diagram of FIG. 13, which represents the course or trend of the above-defined overall area $\phi(s)=X+Y$ plotted along the vertical axis of a channel dependent on the distance, calculated along the base and plotted along the horizontal axis, of the respective cross-sectional area or surface from a reference point. The position $s_2$ corresponds to the cross-section at the stern end of the helical channel, where the so-called annular channel begins and where the overall area of the channel cross-section has its maximum value. This point is denoted by reference numeral 20 in FIG. 13.

On the basis of the above observations the absolute value of the derivative $$\left| \frac{d\phi(s)}{ds} \right|_{s_2}$$

is determined on the basis of the properties of the vortex flow to be produced by the hull with the help of the channel system. This value furthermore depends on the trend of the above-defined magnitude Y on the basis of the following relationship:

$$d\phi/ds = dX/ds + dY/ds$$

Figure 13:
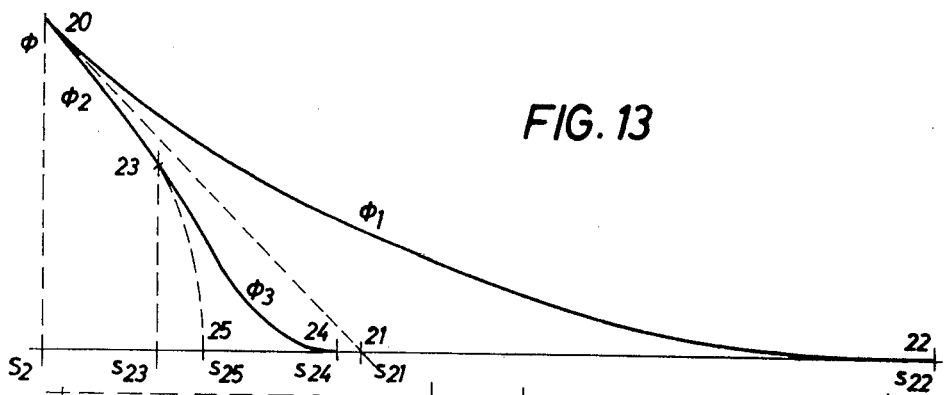
FIGS. 13 to 15 show diagrams for explaining certain principles of dimensioning in accordance with the invention.

Following this, the tangent to the start (point 20) corresponding to the stern end, of the curve representing the course of the magnitude $\phi(s)$, is determined independently of the trend for a change in area of the channel system. In FIG. 13 such a tangent is represented for example by the straight line 20-21, which intersects the horizontal axis at the position $s_{21}$. If therefore the channel system were two be so dimensioned that the overall cross-sectional area would decrease in a linear fashion towards the bows, the channel system would begin at the bows side at the position $s_{21}$ and the channel system consisting of the helical channel and the bottom channel would extend from this point to the point $s_2$. Such a trend would however involve the disadvantage that the water at the point $s_{21}$ would have to be given an excessive transverse acceleration. This can be avoided by giving to the magnitude $\phi(s)$ a trend corresponding to a curve, for which the horizontal axis forms a tangent, as is represented in FIG. 13 by the curve 20-22, which terminates at the position $s_{22}$. The most continuous transition of the channel system into the central and front part of the hull can be achieved by giving the overall cross-sectional area a trend in accordance with the following equation:

$$\phi_1(s) = A(s_{22} - s)^3 \quad (8)$$

which corresponds to the above-mentioned equation (6) for n=3. This, however, leads to a relatively long channel, which under certain circumstances may extend excessively far towards the bows and is not compatible with the dimensions and the purpose of the ship. If the value of the exponent n is decreased in the above equation the positons $s_{22}$ will be displaced towards the stern and come close to the postion $s_{21}$ without moving past it and when n is equal to 1 $s_{22}$ will coincide with the point $s_{21}$, something which however is expedient for the reasons explained above.

If at a value of n, which is somewhat greater than 1 and is still sufficient to prevent detachment of the flow from the channel walls, the channel system should still be excessively long, the change in cross-section of the channel system must be so selected that the curve corresponding to the function $\phi(s)$ in FIG. 13 has at least one section which lies under the straight line 20-21 but is still tangent at the point 20 to the straight line 20-21 and at the opposite end has the horizontal graph axis as a tangent to it. This can be achieved by ensuring that the part, beginning at the point 20, of the curve has a curvature, which is opposite to that of the curve 20-22; this curve then has a turning point at a central position 23, so that it approaches the horizontal graph axis in accordance with the function:

$$\phi_3(s) = D(s_{24} - s)^h \quad (9)$$

in the case of which D is a constant which is so selected that the part, lying between the positions $s_{23}$ and $s_{21}$, of the curve is tangent to the curve 20-23 at the point 23; the exponent h can be a positive number greater than 1, which does not need to be a whole number. The curve section 20-23 on the other hand must correspond to a parabola, whose axis coincides with the horizontal graph axis.

FIG. 13 shows this parabola, in one half, in the form of the curve 20-23-25 for example, the half cutting the horizontal grapgh axis at $s_{25}$. A curve of this type is represented by a function of the formula $$\phi_2(s) = B\sqrt{s_{25} - s} \quad (10)$$

in the case of which the constants B and $s_{25}$ are to be so determined that the curve 20-23-25 has the correct slope at the point 20.

In practice it is however not simple to ensure that the trend of the overall cross-sectional area as a function of the position along the keel line precisely follows an analytical curve. It is generally necessary to be content if the diagram of the actual curve of the overall cross-sectional area does not have any points of inflexion and at the point 20 the straight line 20-21 is tangent to it, the position being determined by the above-mentioned conditions. The curve indicating the actual course of the change in cross-section can in practice be made up of linear sections or of curves, which merge at least approximately tangentially with each other. The main problem resides in that the value of $$\left| \frac{d\phi(s)}{ds} \right|$$

at the position $s_2$ ensures that the incident flow is given the correct peripheral speed within the propeller circle, which is located at the stern end of the channel system. Therefore, in practice it is sufficient to ensure that the curve, which represents the course of the overall cross-section of the channel in accordance with the invention, dependent on the position along the keel line, lies between the above-mentioned analytical curves, which in FIG. 13 correspond to the curves 20-22 and 20-23-24.

The additional towing resistance of the hull, which is brought about by the channel system for producing a pre-established rotating incident flow, clearly becomes less and less in accordance with possible increases in length of the channel system. In many cases it can be expedient to extend the channel system towards the bows beyond the main section as far as the bows section of the hull. When this is the case, it will generally be expedient, even in the case of a V-shaped main section to have a separate arrangement of the symmetrical channel systems provided for the two screws or first to cause the two symmetrical helical channels to run into a central channel and then to cause them to diverge again towards the bows end.

The measures previously described in connection with the invention relates to the shape, the dimensions and the position, relates to the hull, of the shaft shrouds and of the channel system, which are associated with the respective propellers so that on the basis of hydrodynamic principles, which constitute a fundamental part of this invention, the overall efficiency of the propeller is optimised owing to the influence on the incident flow, in which it operates by, on the one hand, precompensating the peripheral component, produced by the propeller, of the propeller flow and, on the other hand, evening the thrust, produced by the propeller blades despite the unavoidable unevennesses of the incident flow through which the propeller cuts its way, by the effect of suitable values for the peripheral component of the incident flow.

Up till now the topic of the danger of enlarging the towing resistance of the hull by the channel systems associated with the propellers has only been touched upon marginally. It is, however, very important for the increase in the towing resistance of the hull not to cancel out the advantages which can be achieved by the above-described measures. This danger exists however if the shape of the stern of the ship is constructed along conventional lines. Thus, more recent investigations have shown that those parts of the skin of a hull provided at the stern with helical channels, which do not make any contribution to the shaping of the shaft shrouds and the channel systems, must comply with certain requirements which previously have not been identified. These features with respect to the parts, not directly belonging to the helical channels and the shaft shrouds, of the skin of the ship also form a substantial part of the subject matter of the present invention.

Figure 14:
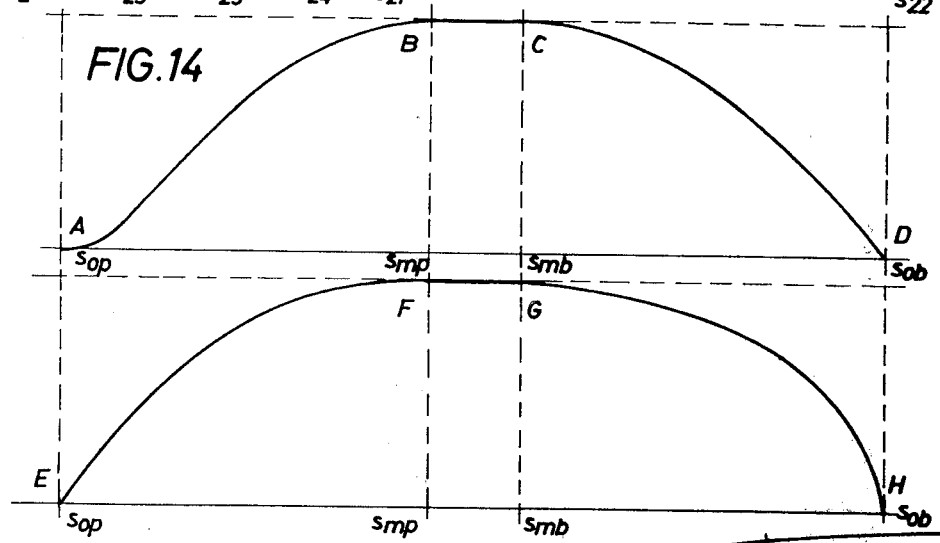

The hulls of all prior art ships, which are driven by one or more screw propellers have large concave zones, for example in the stern section, whose shape differs substantially from the generally convex walls of the hull. These concave surfaces or areas are so shaped that they encourage the flow of the water into the propeller zone. These concave surfaces however lead to provision of an amount wetted surface correlated with a pre-established water displacement, which is increased and, furthermore, the water flow is given a certain longitudinal and transverse acceleration, this increasing the towing resistance of the hull. In the case of sailing ships and rowing boats, more particularly racing boats, as far as possible concave hull surfaces are avoided and in the case of power-driven ships attempts are also made to make concave hull zones under the water line as small as possible. In the case of hulls of ships which in the stern part have helical channels for influencing the flow coming into the screw circle, and whose peripheral components are made use of, it is highly expedient to make it unnecessary for the parts, not directly cooperated with the channel system, of the skin of the ship, as far as is possible, to give the flow a substantial acceleration in a direction perpendicular to the direction of progression. This can be achieved by constructing parts, not belonging directly to the channel system, of the skin of the ship convex, that is to say free of concave zones, this being neither along the water line nor along any other longitudinal sections nor as regards any cross-section which runs perpendicular to the middle of the ship. These features are admittedly advantageous as part of the invention and can be employed, but they do not however constitute the most effective measures which can be adopted in order to keep low the towing resistance of the stern part of the hull looked at as a whole including the surfaces which do not belong to the channel system. In accordance with an advantageous further development of the invention this is achieved instead primarily by a special shaping of the stern part of the skin of the ship, which involves a particular course trend of the cross-section of the part, located under the water line, of the hull, which differs in its shape from conventional constructional shapes, which have corresponding dimensions like the relevant hull with a helical channel. This difference can however not be represented readily on a diagram, drawn in a conventional manner, of the dependency of the hull cross-sectional area (string surface) located under the design water line (KWL) on the position along the base. The difference will however become clear if one considers the square root of the immersed cross-sectional area. This will be explained with reference to FIGS. 14 and 15. FIG. 14 applies for a conventional ship's hull with a central part whcih is cylindrical for example. In FIG. 14 two curves are represented, of which the curve A-B-C-D represents in a conventional manner the dependency of the hull cross-section, located under the KWL, for a predetermined towing resistance as a function of the position along the base of the ship; along the vertical graph axis therefore the area has been plotted and along the horizontal axis the position of the respective cross-section has been plotted. At the position $s_{op}$ the stern ends at the KWL; $s_{mp}$ is the position of the main section on the stern side and therefore at this position, looking from the stern, the cylindrical central part of the hull begins, whose end on the bows side lies at $s_{mb}$, where then the actual bows part of the hull commences, which for its part ends at the KWL at the position $s_{ob}$. The second curve E-F-G-H shows for the small hull the course of the square root of the area or surface lying under the KWL, which has been plotted along the curve A-B-C-D. The difference between the two curves resides in that the two sections A-B and E-F have different shaped while the sections B-C and F-G between the cross-section positions $s_{mp}$ and $s_{mb}$ run horizontally and linearly; the sections C-D and G-H between the section planes at the positions $s_{mb}$ and $s_{ob}$ have finally a curvature which substantially is only directed to one side. The two sections A-B and E-F differ in that the section A-B has a turning point between the two zones at opposite curvature at the ends of the section. In contrast to this the curve section E-F does not have any point of turning and the curvature has the same prefix sign along substantially the whole of the section E-F. This is a feature typical for conventional hulls of ships, whose presence in the case of hulls with helical channels in the stern however leads to a relatively high towing resistance. In order in the case of the hull of a ship with the helical channel stern to achieve the lowest possible towing resistance it is thus essential for the curve, which indicates the dependency of the square root of the surfaces or areas of the sections lying underneath the KWL in accordance with the position along the base, to have a different, characteristic course, which will be explained with reference to FIG. 15.

Figure 15:
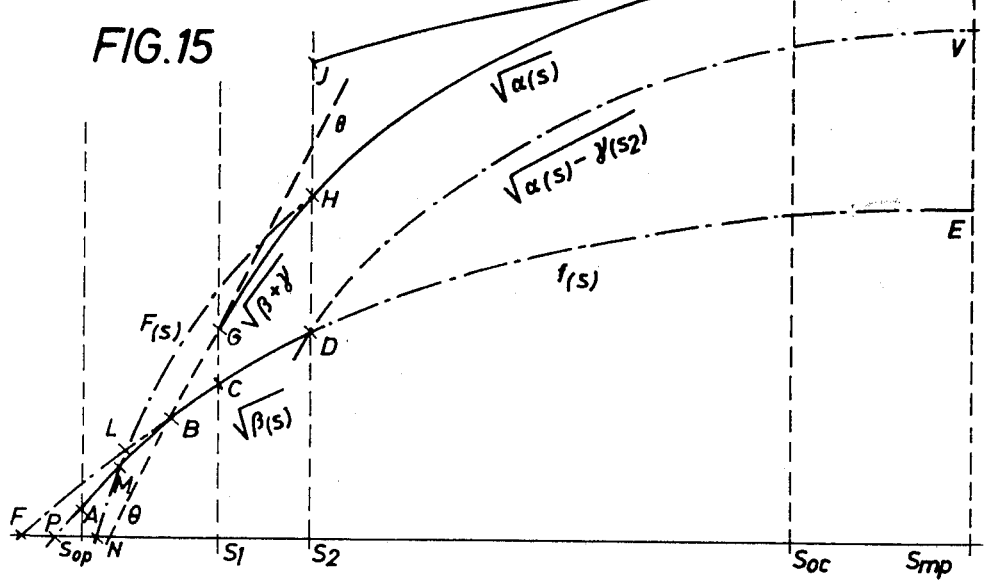

FIG. 15 shows how the square root of the area or surface of the cross-sectional part located under the water line, of a hull with a helical channel stern is to vary in accordance with the position along the base of the ship between the end $s_{op}$ at the stern end, at the KWL and the main section on the stern side at the position $s_{mp}$. The curves in FIG. 15 all correspond to the section E-F of the diagram represented in FIG. 14, which applies for a conventionally designed hull of the ship, whose dimensions correspond to those of the hull with the helical channel stern, for which FIG. 15 applies. The diagram in FIG. 15 does not, like the lower portion of FIG. 14 comprise merely a single curve section, whose curvature has the same sign everywhere, but rather two principal curve sections A-B-C-D and G-H-K-I, which both extend over the same sections $s_1$-$s_2$ of the horizontal graph axis. The position s corresponds to the stern end of the shaft shrouds, while the position $s_2$ corresponds to the stern end of the helical channel. The curve A-B-C-D therefore constitutes the course of the square root of the cross-sectional surface or area of the part, located underneath the KWL, of the cross-section at the stern end of the hull between the positions $s_{op}$ and $s_2$ as a function of the position without including the cross-sectional area of the shaft shrouds as well. The curve G-H-K-I indicates for its part the course of the square root of the cross-sectional area of the whole part, located underneath the KWL, of the cross-section of the hull part on the stern side between the position $s_{mp}$ at the main section, on the stern side, and the position $s_1$, which corresponds to the stern end of the shaft shrouds. This curve therefore comprises the cross-sectional area of the shaft shrouds at the position under consideration. If the function, which indicates the dependency of the part, located underneath the KWL, of the entire stern section of the hull on the position of the cross-section, is denoted by $\alpha(s)$ and if the area or surface of the part, located underneath the KWL, of the hull cross-section at the stern end, not including the shaft shrouds, in a corresponding manner by $\beta(s)$, then the cross-sectional area $\gamma(s)$ of the shaft, shrouds at the position indicated between the positions $s_1$ and $s_2$ is given by the following equation $$\alpha(s) = \beta(s) + \gamma(s) \tag{11}$$

The curve A-B-C-D thus indicates graphically the course of the function $\sqrt{\beta(s)}$, while the curve G-H-K-I denotes the course of the function $\sqrt{\alpha(s)}$.

In FIG. 15 furthermore a straight line $\theta$ is drawn in, which represents a tangent of the curve section G-H-K-I at the end G. The broken straight line $\theta$ cuts the curve section A-B-C-D at the point B. In FIG. 15 furthermore a straight line A-P is drawn in, which is a tangent to the curve section A-B-C-D at the point A and cuts the horizontal graph axis at the point P. The broken curve F-C-D-E can be represented by an analytical function of the degree i in the following manner:

$$f(s) = C_3[1 - C_4(s_{mp} - s)^i] \tag{12}$$

In this formula $s_{mp}$ denotes the position of the main section on the stern side, s denotes the variable corresponding to the position of the cross-section taken into consideration and $C_3$ and $C_4$ denote two constants which are so selected that the curve F-C-D-E, corresponding to the function f(s) contacts the curve section A-B-C-D in at least one point lying in the section C-D. The exponent i is a positive number between 2 and 4, which does not need to be an integer.

In FIG. 15 furthermore a broken line H-L-M-N is represented, which constitutes a continuation of the curve section H-K-I and which cuts the curve F-L-C-D-E at the point L, the curve section A-B-C at the point M and finally the horizontal graph axis at the point N. The broken line H-L-M-N can be represented analytically by the following function of the degree m.

$$F(s) = C_1[1 - C_2(s_{mp} - s)^m] \tag{13}$$

in the case of which the constant $C_1$ is equal to the square root of the surface or area of the part, located under the KWL, of the main section on the stern side (that is to say $C_1 = \sqrt{\alpha(s_{mp})}$) and the other symbols have the above-mentioned meanings. The curve in FIG. 15 corresponding to the function F(s) thus comprises the point denoted by I. The constant $C_2$ is so determined that the curve represented by the function F(s) comprises the point denoted by H, this meaning that the function F(s) has at the position $s_2$ corresponding to the stern end of the helical channel, the value of the square root of the part, located underneath the KWL, of the cross-section of the hull at this position. The exponent m is a positive number which does not need to be a whole number, but must be so selected that either the curve section G-H-K-I is tangent at the point H to the broken line curve H-L-M-N, which represents the function F(s), or else that the broken line H-L-M-N intersects the curve section G-H-K-I as at least one additional point in the zone G-H, that is to say on the stern side of the position $s_2$ where it intersects at H. In FIG. 15 by means of a broken line D-V the difference between the value of the square root of the surface or area of the part, lying underneath the KWL, of the hull cross-section between the main section on the stern side at the position $s_{mp}$ and the position $s_2$ is decreased in accordance with the stern end of the helical channel, and the cross-sectional area of the shaft shrouds is represented at the position $s_2$. The curve D-V thus represents the course or trend of the magnitude $\sqrt{\alpha(S)} - \gamma(S_2)$.

The investigations on which the present invention is based have shown that for the shaping of a hull with a helical channel stern as regards the trend of the cross-sectional areas lying underneath the KWL, it is not possible to use the same hulls as are used in the design of prior art hull shapes. Thus, if in dimensioning a hull with a helical channel stern one proceeds in accordance with the area of surface diagram for a corresponding conventional hull, the danger will exist of such a large towing resistance being produced that the advantages obtained by the other technical measures in accordance with the invention are partly or completely lost. The diagram, which indicates the trend of the part, located under the water line, of the cross-section of the hull of a ship with a helical channel stern, therefore has a particularly characteristic shape. This is due to the fact that the shaft shrouds with reference to the stern end of the hull behave like completely immersed bodies, which do not have any connection with the hull of the ship, although in reality they are in fact connected with the hull. As regards the towing resistance the stern end of the hull must therefore be so shaped as if the hull did not comprise any shaft shrouds at all.

It follows from this that the shapes of the two parts of the same hull, that is to say on the one hand the stern part of the hull without the shaft shrouds and the part consisting of the stern half of the hull with the shaft shrouds must be dimensioned like two independent hulls, which move with each other and in part intersect each other, but in other respects must fulfill the conditions applying in the case of a body towed through water, independently of each other. The shape of the shaft shrouds itself only has to be drawn having regard to the indirect contribution of towing resistance owing to the mutual interaction of the two hull parts under consideration. Furthermore, the shaft shrouds must end in front of the propellers on the bows side, and the propellers must be arranged in front of the steering rudders and the latter must be located below the part, lying underneath the KWL, of the stern end of the hull. In the diagram represented in FIG. 15 accordingly the linear extension, directed towards the stern, of the curve G-H-K-I, representing the cross-sectional part, under the KWL, of the stern half of the hull, (which comprises one section G-B, which at the point G is tangent to the curve G-H-K-I), intersects at one point the curve A-B-C-D, which represents the course of the part, located under the water line, of the cross-section of the stern end of the hull, or the linear extension, making contact with this curve at the point A, or tangent A-P.

The two intersecting curves B-G-H-K-I and P-A-B-C-D thus form an obtuse angle, which is concave in the opposite direction to the concavity of the respective curves A-B-C-D and G-H-K-I alone. This particular feature can readily be seen in the diagram, in which the square roots of the cross-sectional areas are plotted but cannot be seen in the known diagrams, in which the cross-sectional areas located under the KWL, themselves are plotted. It can be seen at a first glance that these two curves diverge between the points, corresponding to the positions $s_1$ and $s_2$ towards the bows. It can furthermore be seen that the curves A-B-C-D and G-H-K-I, which correspond to the magnitudes B(s), and respectively, $\sqrt{\alpha(s)}$, looked at by themselves, do not have any points of inflexion or turning points, and only have straight and curve sections, which are tangent to each other at the points of connection and are concave with respect to the interiors of the hulls, which in the diagram of FIG. 15 corresponds to that side, on which the horizontal graph axis lies. Looked as a whole the diagram, which consists of the above-mentioned curves A-B-C-D and G-H-K-I, only has one zone which is concave in the opposite direction and this concave zone is placed at that position where the two curves A-B-C-D and G-H-K-I intersect or their extensions directed towards the stern intersect.

As regards the shape of the hull in particular the value of the magnitude $\sqrt{\alpha(s)}$ must at least one position corresponding to the helical channel the channel, i.e. between positions $s_4$ and $s_{oc}$ in FIG. 6, astern of position $s_{oc}$ in FIG. 15, be equal to the value of the function F(s) and the positive exponent m of the function F(s), though it does not necessarily have to be an integer must have a value between 2 and 4.

Let us now examine the curve A-B-C-D, which represents the course of the magnitude $\sqrt{\beta(s)}$, and the curve, which represents the above-defined function F(s). When the value of the exponent i of the function f(s) is equal to the value of the exponent m of the function F(s) and the values of the constants $C_3$ and $C_4$ are so selected that the curve, represented in the function f(s) intersects the piece of the curve A-B-C-D at a point of the section C-D, that is to say between the positions, which correspond to the stern ends of the shaft shrouds and, respectively, of the helical channel, the line representing the function f(s) on the bows side of the position corresponding to the stern end of the helical channel may not cut or make contact with the curve H-K-I representing the magnitude $\sqrt{\alpha(s)}$. On the other hand, the curve representing the function f(s) will cut the curve representing the function F(s) on the stern side of the position, which corresponds to the stern end of the shaft shrouds and in this zone the value of the function f(s) will always be larger than the value of $\sqrt{\beta(s)}$. Furthermore, the square of the constant $C_3$ must be smaller than the square of the above-defined constant $C_1$ minus the value of the area $\gamma(s_2)$ of the maximum cross-section of the shaft shrouds which is at the position $s_2$, which corresponds to the stern end of the helical channel, where the helical channel merges with the annular channel. Furthermore, when the area $\alpha(s)$ of the part, lying under the KWL, of the cross-section of the hull is reduced by the area $\gamma(s_2)$ of the maximum cross-section of the shaft shrouds, which was defined above, the remainder in the interval corresponding to the helical channel must be larger than the square of the function f(s) for the corresponding position.

The above-described examples of the invention apply for a two-screw ship with two helical channels in the opposite direction of rotation, which symmetrically run with respect to the center of the ship. The two propellers, which respectively are arranged at the stern end of one of these helical channels, beat in the opposite direction as regards the rotating incident flow, which is produced by the hull at the stern end of the channel system. The above observations however also apply in effect for the hulls of ships with more than two ship's propellers or channels providing that at the stern end of each helical channel a ship's propeller is arranged, whose shaft runs within a corresponding shaft shroud. The above-mentioned principles furthermore apply for cases in which the helical channels open at the bows side separately or in groups in one or more keel channels. Generally, the number of helical channels and the propellers provided for them is even and they are arranged respectively in pairs symmetrically with respect to the middle of the ship, which does not exclude the possibility of providing an additional propeller without an associated helical channel in the middle of the ship so that in all an uneven number of propellers is present.

If more than one pair of symmetrical helical channels is present, the stern ends of the shaft shrouds, the propellers and the ends of the corresponding helical channels can respectively lie in the same transverse planes. In this case the above-mentioned observations as regards the course of the square root of the area sections of the hull and of the channel systems can be directly used. if, however, the different pairs of symmetrical screws, shaft shrouds and helical channels are offset in relation to each other in the longitudinal direction, the corresponding curves in the diagram of FIG. 15 in each case have interruptions and overlapping parts in this position, where a pair of shaft shrouds and the corresponding helical channels end. As has been explained above with respect to the concave zones, the points of intersection and the course of the curves represented in FIG. 15, applies in each case for the interval between the stern end of the hull at the water line and the stern end of the first pair of channels and then again for the next interval between the last-mentioned position and the as the principal cross-section of the stern. The discontinuities of the diagram, the converging intersecting parts and curve parts of the curves forming the diagram must be repeated each time in accordance with each stern end of a symmetrical pair of shaft shrouds and the corresponding helical channels.

In the case of the above cross-sectional diagrams the usual means which are provided on the hull such as rudders, nozzles, fins, struts, shafts, supports, bearings, propeller shaft passages, which do not belong to the helical channel system, have been left out of consideration.

In some cases it is possible to arranged nozzle parts at the stern end in order to terminate the limit of the annular channel on the stern side of the helical channel, as is represented by broken lines in FIGS. 6 and 7. In this case the nozzle parts, which terminate the annular channel belonging to the helical channel, are also regarded as appendages or additions and in the case of the diagram of the square roots of the cross-sectional areas are left out of consideration. In the case of the use of nozzles the latter do not need to be coaxial with respect to the associated propeller and instead it may be convenient to make the arrangement so that the propeller axis and the axis of the nozzle do not coincide. It is furthermore not necessary for the axis of the nozzle to run parallel to the direction of progression when travelling ahead and instead it can be convenient to arrange the nozzle axis obliquely with respect to the direction of progression. It is furthermore not necessary for all radial cross-sections of the nozzle to be even or the same and in many cases it may in fact be convenient for these cross-sections to change along the peripheryof the nozzle both as regards the outline and also as regards the length and breadth.

When the principles of the invention are fully employed and at the stern end of the helical channel such a flow is produced that the propeller blades can exert practically a constant thrust during one revolution and are not subjected to any variations in force, it is possible to make the number of propeller blades as small as possible. In this case it is possible to make do with a propeller with only two blades and to make use of the advantages as regards the increase in efficiency, which result as regards the thrust and the speed of rotation of a two-blade propeller vis-à-vis a corresponding propeller with three or more blades. The use of two-bladed propellers in conjunction with a stern with a helical channel, which is constructed in accordance with the principle of the invention thus leads to a particularly advantageous form of construction of the invention.

The principle of the invention can be employed both in the case of surface boats and also submarine boats of any desired type including model and toy boats.

The invention described above is also applicable to a ship having a single screw propeller or to a ship having an odd number of screw propellers. In case of an "unpaired" helical channel, the wake is inherently asymmetrical because it comprises a flow component generated by the unpaired helical channel.

According to a further aspect of the invention, this asymmetry caused by such an unpaired helical channel is compensated for by an appropriate asymmetrical shaping of convex regions of the ship's hull, said regions forming no part of the helical channel system of the ship's hull.

This aspect of the invention is based on the discovery that a vortex $B_1-B_2$ (FIG. 16) within a liquid body represents basically an unlimited cylindrical structure which, however, under certain circumstances may close in itself to form a ring (similar to a smoke ring) or ends in a limiting surface of the liquid, with respect to which its axis of rotation becomes established automatically in a perpendicular direction.

In the case of a two screw ship, whose stern part comprises a pair of helical channels, as is the case with the above described embodiments, the two vortices, which are mirror-symmetrical with respect to the midships plane and are produced in the screw channels, are connected with each other hydrodynamically by the circulation produced by the hull shape and therefore in effect are driven partly by the energy of movement of the ship. In order to obtain this benefit in the case of a single or unpaired screw ship with a single helically shaped channel supplying the flow entering the single (or unpaired) screw propeller, it is necessary to ensure that the single vortex produced by the helical channel forward of the oppositely rotating screw is promoted by the circulation, produced by the hull of the ship in the water (and which occurs in place of the complementary vortical flow present in the case of a twin screw ship) by vortex formation, which ends at the other end substantially perpendicularly to the water surface and on which the ship floats and in which the hull part of the ship located on water is mirror imaged.

This is achieved in accordance with this aspect of the invention that a convex part of the hull which does not belong to the helical channel and lies under water, more particularly in a position adjacent to the stern, is asymmetrically shaped more particularly so that it acts on the water like a blade (or wing) dipping into the water from above. At the downstream edge of such a blade, as is known, a vortex is generated, whose axis assumes the direction of relative movement of the water with respect to the blade.

Figure 16:
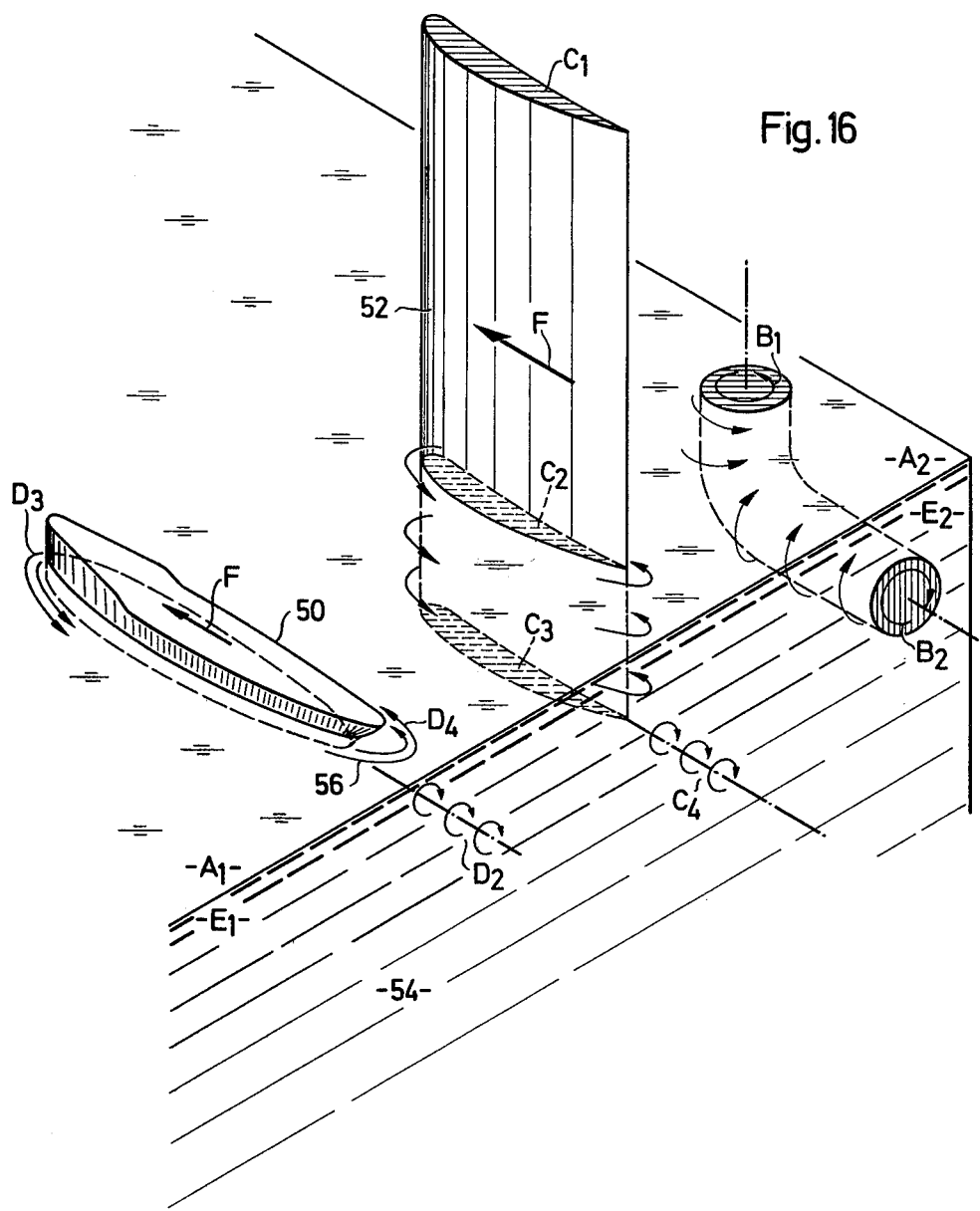
FIG. 16 is a schematic diagram for explaining how the invention can be applied to a ship having a single propeller.

Specifically, as shown schematically in FIG. 16 the circulation about an asymmetrical ships hull 50 and a vertically immersed blade 52 are represented under the supposition that the two move with the speed F with respect to a mass of water 54. The vortex 56 produced by the ships hull ends forward of the oppositely rotating screw (not shown) and is interrupted by the latter and completely taken up.

$A_1-A_2$ is the water surface;

$B_1-B_2$ is a water vortex which is terminated by its own mirror image produced at the water surface;

$C_1-C_2$ is the portion of the blade 52 extending from the water surface upwards;

$C_2-C_3$ is the immersed portion of blade 52;

$C_3-C_4$ is a vortex generated at the trailing edge of the blade;

$D_2$ is a vortex generated in the wake of the ship;

$E_1-E_2$ is a vertical plane normal to the direction of movement of the ship and blade;

F is the direction of movement in respect to the body of water 54;

$D_3-D_4$ is a vortex generated by the asymmetric form of the hull and encompassing the hull.

In practice the outwardly curved part of the stern part of the ships hull (in a manner similar to certain mussels) can consist of parts which are differently shaped with respect to the longitudinal direction of the ship.

If such a ship's hull which is asymmetric with respect to its two sides, is to have the same water displacement on both sides with respect to the midship plane, it is neither necessary nor probable that the propeller will lie symmetrically with respect to the midships plane, as is the case with a normal single screw ship. Preferably the propeller is, however, so arranged that the midship plane cuts the propeller disc at a point removed from its centre so that the moment of the pair of forces or couple, which is formed by the resistance force exerted by the water on the hull moved through the water and the thrust force exerted by the propeller, does not become excessively large and impair the manoeuvrability of the ship. A straight course of steering is only guaranteed if the force couple (moment), which consists on the one hand of the longitudinal and transverse components of the water resistance and on the other hand of the longitudinal and transverse components of the propeller thrust, is in equilibrium with the torque acting about a perpendicular axis and which is exerted on the asymmetrical ships hull by the hydrodynamically produced circulation. A similar result can also be obtained if the bows are constructed in an asymmetrical manner so that the difference in pressures, which act hydrodynamically on the two sides of the asymmetrical bows, exerts a torque about the vertical axis of the ship, and this torque at least approximately compensates for the torque produced by the vortex formation in the wake hydrodynamically on the ships hull.

The foregoing considerations are illustrated in FIGS. 17-26. FIGS. 17-21 illustrate the case of a propeller centered on the longitudinal and vertical midship plane and FIGS. 22-26 illustrate the case of a propeller offset slightly from amidships in accordance with the principles just described.

Both sets of figures show the manner in which the hull is shaped asymmetrically so as to provide a vortex of the kind illustrated in FIG. 16. The upper hull portion emerging from the waterline is kept substantially symmetrical respecting the traditional hull-shape and splitting the streaming air symmetrically. The convex surfaces of the immersed hull portion, not involved with the channel system, become instead gradually unsymmetrical the more the depth increases, until the hull-bottom, leading into the shaft shroud, is made definitely asymmetrical in order to generate inside of the streaming water the wake-vortex which detaches astern of the hull after surrounding the shaft-shroud and having been calibrated by the helical and annular portions of the channel.

FIGS. 18 and 19 are respectively a stern view and a bottom view showing respectively the outline of vertical plane sections and horizontal plane sections of the afterbody of a hull providing a helical channel cooperating with a propeller 60. FIGS. 17,20 and 21 illustrate a closely similar hull afterbody that differs from FIGS. 18 and 19 by the provision of a Kort nozzle 62, the propeller not being shown in this case, but the propeller disc being shown at 63. FIGS. 17 and 21 are the sheer plans viewed from the starboard and port sides respectively. FIG. 20 is a stern view like FIG. 18 with the relatively uninteresting extreme right portion left out. Since the same principles are involved in the features and design of the helical channel in the embodiment shown in FIGS. 17-21, as are involved in the embodiment shown in FIGS. 6-12, it is not necessary to describe these figures further.

As mentioned before, FIGS. 22-26 relate to a similar hull afterbody in which the propeller is offset from the midship plane. Here FIGS. 23 and 24, like FIGS. 18 and 19, illustrate the case where no Kort nozzle is provided, while FIGS. 22, 25 and 26 illustrate the case in which a Kort nozzle 65 is provided.

Figure 23:
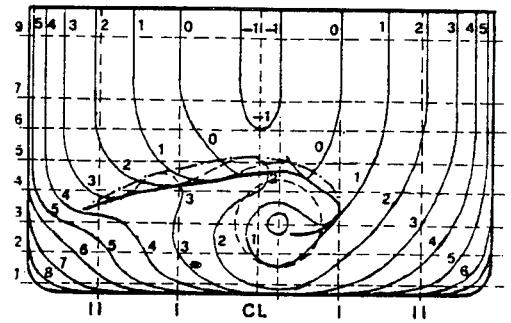
Figure 24:
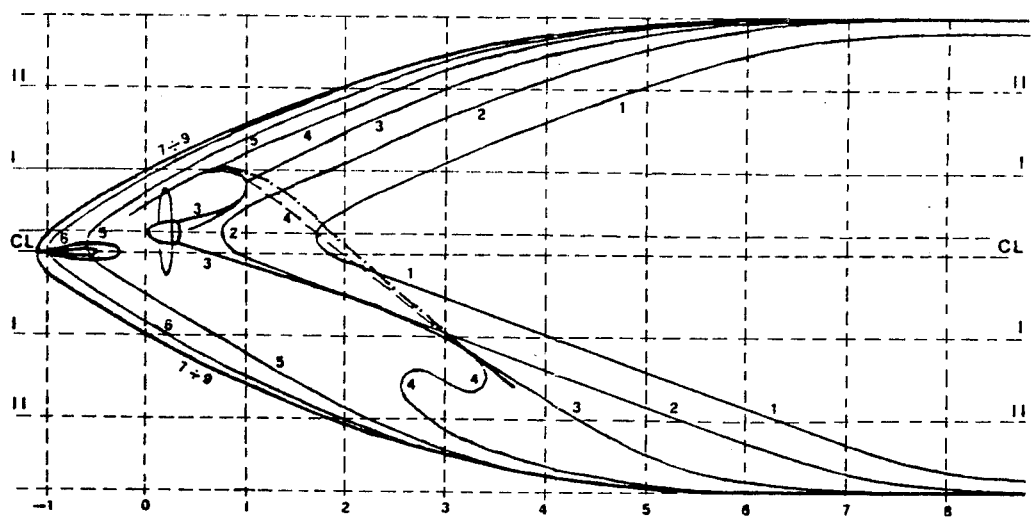
Figure 25:
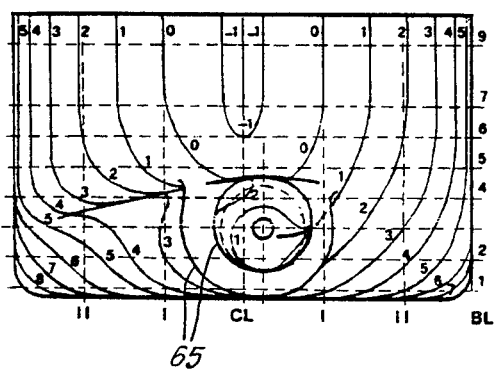

In a vessel with three screws, the central screw is normally located farther aft than the screws on either side, so that the provision of three helical channels in the hull can be accommodated more easily than might be supposed from a glance at FIG. 18, FIG. 23 or FIG. 25. In any event, it is evident enough from the hull shapes illustrated for the twin screw and single screw case in detail what sort of configuration would result from the application of the method of the invention to the design of the antibody of a hull of a three screw ship. The same may be said for the cases for the cases of four or more screws. Thus, in the case of four screws, the central pair of screws would be located farther aft than the other pair and the configuration of the hull in their neighborhood would be closely similar to that illustrated for the twin screw case in FIGS. 6-12, whereas the helical channels for the farther forward pair of screws would of course be mirror images of each other and be similarly designed, but of course they would be farther apart.

In the righthand portions of FIGS. 18, 20, 23 and 25, it may be observed that the section lines as far back as station 1 on FIGS. 18 and 23 and as far back as station 2 on FIGS. 20 and 25 are similar with the afterbody section lines of a sailing ship.

Figure 22:
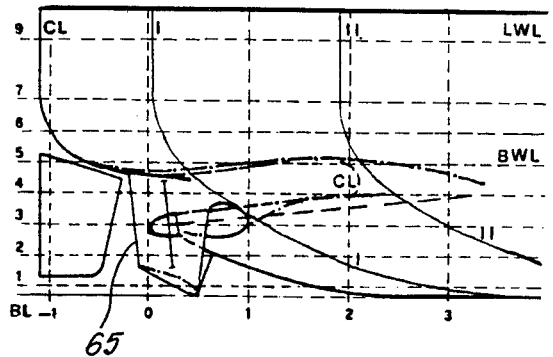
FIGS. 22–26 are sets of lines for the afterbody of a hull in which the propeller shaft is offset from the vertical center plane of the hull, rather than centered in that plane as in the case of FIGS. 17–21, but in other respects FIGS. 22–26 correspond respectively to FIGS. 17–21.
Figure 26:
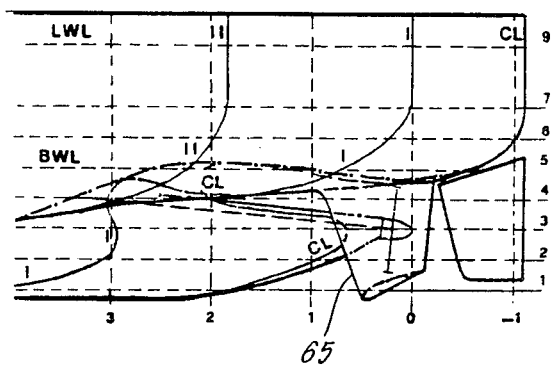

FIGS. 20 and 25 respectively show views of the Kort nozzles 62 and 65, which are shown in side views respectively in FIGS. 17 and 22 from the starboard side and in FIGS. 21 and 26 from the port side. The Kort nozzles shown in these figures are essentially similar to the one shown in side view in FIG. 6 and somewhat diagramatically in end view in FIG. 7 for the twin screw case.

As is evident from the side views, which show the section of the nozzle thickness at the bottom, the nozzle is not simply an annular piece of sheet steel, but instead its thickness has a shaped hydrofoil section, essentially streamlines, and somewhat asymmetrical to favor a definite difference of the flow velocity inside the different sectors of the nozzle.

The end views in FIG. 7, FIG. 20 and FIG. 25 show that the nozzle is essentially circular in athwartships section but generally not concentric with the propeller disc which is shown in broken lines in FIGS. 20 and 25, the propeller itself being shown in FIG. 7. It is also evident from the inclination of the bottom of the nozzle visible in the side views that these nozzles are deprived of a cylindrical symmetry and it is clear from FIGS. 20 and 25, where two contours of the nozzle are provided, identified with the reference numeral 62 in FIG. 20 and 65 in FIG. 25, that the axis of the nozzle passing through the approximately circular contours shown on these fitures is not aligned with the longitudinal dimension of the hull. Since it may be found appropriate, as in these cases, by model tests making use of the method of the present invention of analyzing the distribution of the axial and tangential components of the wake incident on the propeller disc, to tilt the axis of the Kort nozzle both in the vertical and in the horizontal plane with respect to the horizontal length dimension direction of the ship's hull, it may likewise be found appropriate for this tilt to be different than that of the propeller shaft (which, in the single screw cases of FIGS. 20 and 25, may be assumed to be aligned with the longitudinal direction of the ship in the horizontal plane, although not in the vertical plane). FIGS. 21 and 22 show by the outline of the forward edge of the Kort nozzle that there is a lateral tilt to the nozzle and actually in one direction in FIG. 21 and in the other direction in FIG. 22.

It is also evident from the end views in FIG. 20 and in FIG. 25 that the cross-section of the outline of the nozzle in the axial plane of the nozzle that is parallel to the horizontal is necessarily different from the vertical plane cross-section of the nozzle, which last does not differ very much from the vertical plane profiles of the nozzle visible in the side views. A difference would similarly be found in the nozzle cross-sections referred respectively to a vertical plane through the propeller shaft and to a plane at right angles thereto also passing through the shaft axis. It is also evident that the nozzle is longer at the top than at the bottom. The hydrofoil profile of the nozzle shell can also vary, for example, between the bottom and the sides.

Something should be said about the methods by which the incident flow characteristic of a hull afterbody shape for a given speed of the hull through the water is determined.

Towing tests of a model with windmilling screws are useful because the speed of advance and the rate of rotation of the wake in relation to the propeller discs are then measured according to the very same way in which they are perceived by the screw. This is a useful supplement for checking the results obtained by the survey using Pitot tubes over at least an annular band of the two local wake components which affect the behavior of the propeller blades, namely the axial component and the component situated tangentially to the circles forming the propeller discs. The models should preferably be tested without rudders, because these hinder the wake survey be means of Pitot tubes and they should be left out in the first development phase at least.

Three-hole Pitot tubes have been found particularly useful and can be quite effectively calibrated.

Pitot tubes can be mounted so as to explore separately the peripheral components of flow and the axial components of flow at the propeller discs. The models must of course be of sufficient size and the Pitot tubes sufficiently small so that the presence of the measuring instrument does not appreciably distort the flow pattern. Tests with windmilling screws or equivalent whirligigs that measure the twist of the vortex at the propeller disc as the model hull moves through the water can be checked against the Pitot tube test to verify that the Pitot tube instrumentation has not appreciably disturbed the flow that is measured.

The rate of hull advance is of course provided by towing in a still water model tank, but in a number of institutions it is now possible to test models in tanks provided with flowing water, thus corresponding to the wind tunnels that have been used for many decades for aerodynamic tests.

Conceivably, it would be possible to measure $V_s$ in a Pitot tube aligned with the vector $V_s$ (FIG. 1) in a device which would record at the same time the direction of the vector rather than to measure axial and tangential components by individual Pitot tubes.

For the purpose of drawing, for a given hull, a characteristic curve of the wake (called also "inflow-diagram"), with respect to the relevant propeller blade portion covering an annular zone both sides of the radius $r_q$, and in respect to all sectors of the propeller disc, the values of the incident flow speed $V_s$ are preferably obtained from a wake survey performed with 5-hole Pitot-tubes.

One or more of such Pitot-tubes are placed (alternatively) at various points spaced over the propeller disc of a ship, which is towed at a given speed (or of its model at the corresponding speed in a test tank). Said measuring points are scattered with a suitable density and regularity all over the propeller disc.

The mean value of the axial wake components measured on all points situated inside of a sector of the annular band corresponding to the considered annular element of the propeller blade, placed at a given angular position with respect to its shaft, gives the axial component $V_a$ of the local value of the incident flow speed $V_s$. The corresponding value of its tangential component $V_t$ is obtained by taking the mean value of the speed components of the wake, measured tangentially with respect to the circles of the propeller disc, at the same points which have been considered for obtaining the axial component $V_a$ of $V_s$.

The annular band considered is preferably centered on the radius fraction $0.8 = r_q/r_m$ where the blade exerts its maximum thrust, and extends possibly to the propeller circles having the radius fractions 0.65 and 0.95. Since however the method is an empirical and approximate one, these figures are cited only as examples and in practice have to be chosen in accordance with the precision expected as well as with the location of the measuring points which can be actually reached by the Pitot-tubes.

As to the sectors of the annular band of the propeller disc over which the mean values are taken, they correspond to the length of the blade element considered and extend in general from 10° to 20° (or even more) both sides of a series of angular positions of the propeller blade, spaced all around a whole turn of its shaft, possibly (but not necessarily) at regular intervals, say every 20° or 30° and even 45°.

I claim:

1. A method of establishing the configuration of the underwater afterbody of the hull of a screw-propeller-driven ship provided with a helical channel for guiding the flow of water relative to the advancing hull towards a propeller when the ship is under way, comprising the performance of the basic steps of measuring the water flow relations at the propeller disc location of a model of a proposed hull, then modifying the model to optimize the shape of the underwater afterbody of the hull, and finally, after repetition of the measuring and modifying steps as found necessary or desirable, establishing a hull afterbody configuration with more favorable water flow relations at the propeller disc, in which method there is the improvement consisting in that:

the measurement of the flow relations at the location of the propeller disc of a model is a measurement of the tangential and axial velocity components $(V_t, V_a)$ of water flow entering the propeller disc when no propeller is present at enough points around the propeller disc to establish a characteristic curve which gives the incident flow velocity vector $(V_s)$ against a blade of a propeller of a selected configuration at a selected operating speed of revolution at a radius $(r_q)$ value typical for effective thrust development, expressed in coordinates of tangential and axial vector components $(V_q, V_a)$, disregarding any radial components, for various values of the angular position of a propeller blade around the propeller axis;

there are established, for comparison with results of said flow relation measurement, the thrust values of the blade of a selected propeller for the full range of incident-flow vectors that are of interest;

the thrust value relations to incident-flow vectors are used to plot "isodyne" lines and said characteristic curve on the same vector field, to show incident flow of velocities at respective locations around the propeller disc in coordinates of tangential and axial flow velocity $(V_q, V_a)$ and simultaneously to show the range of propeller blade thrust variation resulting from the same combinations of tangential and axial flow;

the step of modifying the tested model in respect of the position of the propeller disc and the location and shape of a helical channel and the cross-sectional taper of the stern portion of the hull on the thrust variation range of a propeller revolution is carried out by reference to the relation of corresponding modified characteristic curves to the propeller isodyne lines on a common vector field plot of tangential and axial flow velocity $(V_q, V_a)$ and the modifying of the model so as to reduce the thrust variation range of the propeller blade revolution is thereby carried out to an extent beyond which reduction would no longer be economically justified by the relation of construction complication to the degree of further reduction that is producible.

2. A method as defined in claim 1 in which the step of modifying said model is carried out only until a characteristic curve is found only a small portion of which is intersected by any one propeller isodyne in less than four points, counting a point of tangency as two points.

3. The method as defined in claim 1 in which the steps of measuring water flow relation with respect to a model and modifying the model are performed only enough times to produce a characteristic curve indicating that the tangential component of flow is directed opposite to the direction of revolution of the propeller over at least two-thirds of the circle of the revolution of the propeller at said typical radius value $(r_q)$ and that the ratio of maximum to minimum thrust of a propeller blade around its circle of revolution, indicated by the farthest apart isodynes (k, l) tangent to said characteristic curve, is less than two.

4. A method as defined in claim 1 in which the step of measuring water flow relations is performed for a set for locations around the propeller disc that are spaced from one to the next by not more than a quarter of a full propeller revolution, and in which the steps of measuring and modifying with respect to a model are carried out until a characteristic curve is established in which the portions thereof relating to axially symmetrically lying quadrants of the propeller circle at said typical radius value $(r_q)$ show substantially equal flow components, of which the tangential component $(V_t)$ is directed oppositely to the direction of revolution of the propeller.

5. A method as defined in claim 1 in which the steps of measuring and model modifying are carried out until a characteristic curve is established indicating that the thrust of said blade of selected propeller in passing through a sector of the propeller disc that is below the horizontal is greater at the ship velocity chosen for the measuring step than the thrust exerted upon the passing of said propeller blade through a corresponding sector of the propeller disc above the horizontal bisector of the propellor disc.

6. A method as defined in claim 1 in which the steps of measuring and modifying are carried out until a characteristic curve is established in which the force range corresponding to the isodynes which cut the characteristic curve established by the method in more than two points is greater than the force range corresponding to the isodynes which cut the characteristic curve in two and only two points.

7. A method as defined in claim 1 in which the steps of measuring flow relations and modifying a model are carried out until a characteristic curve is established indicating that at the speed regarding which the measuring steps are performed, the mean tangential component $(V_t)$ of incident flow at the propeller disc, referred to said typical radius value $(r_q)$, said radius being chosen as the one in which the average thrust has its maximum value, lies between the minimum value $$V_{Tm} = 0.3 \frac{g}{\pi q} \frac{q}{\delta} \frac{M_e}{D_e^3 V_A}$$

and the maximum value $$V_{TM} = 0.9 \frac{g}{\pi q} \frac{q}{\delta} \frac{M_e}{D_e^3 V_A}$$

in which the quantities in the foregoing formulas signify:

$M_e$: average value of torque transmitted, by the propeller shaft in one rotation, to the propeller
$D_e$: diameter of propeller disc
$V_A$: average value of axial speed
g: acceleration due to gravity
$\delta$: specific weight of water
$r_q$: typical value of radius selected for thrust determinations
q: $2r_q/D_e$.

8. A hull for a ship having a pair of counter-rotating propellers on opposite sides of the lengthwise vertical median plane of the ship on the stern portion of the ship for driving the ship by rotation of the propellers, each on a propeller shaft, in the direction in which the propeller blades move downward when they are in the quadrant of their revolution directed towards said median plane, said hull including for each propeller shaft a shaft shroud body extending aft from a propeller shroud root bulging from the portion of the hull in which the hull cross-section below the waterline tapers towards the stern of the hull, and said hull being further provided with a pair of helical channels affecting the profiles of said shroud roots as well as of said hull portion and respectively leading to each propeller so as to lead water, during forward motion of the ship with a component of twist around the aft portion of the shaft shroud, to the path of the propeller blades, in the direction of twist that is contrary to the direction of revolution of the propeller, in which hull there is incorporated the improvement consisting in that:

the helical channel in each case terminates by merger into a clear annular space surrounding the propeller shaft shroud at a location where the channel profile (UQT) reaches substantial tangency to the aft end of an external hull skin surface (LQS) connecting the main portion of the hull to the propeller shaft shroud and the line (RQ) drawn to the place (Q) where said tangency is reached from the center of curvature (R) of the portion of the shaft shroud surface tangent to a vertical line on the opposite side of the shaft shroud, which line lies in an athwartship plane passing through said place of reaching tangency, runs, from above center of curvature, at an angle not more than 40° above the horizontal, nor more than 60° below the horizontal, the stern portion of the hull aft of the merger of said helical channels into said clear annular spaces is not supported by any keel, fin or deadwood structure extending to the neighborhood of the plane of the bottom of the hull;

the most concavely bent portion of the profile of the helical channel is in each case near the point (P) of tangency thereto of a line drawn through the center of curvature of the profile, in the same athwartship vertical profile plane, of the part of the propeller shroud root tangent to a vertical line, for all parts of the propeller shroud root having a profile passing through the vertical, and the curvature of said most concavely bent portion of said profile does not decrease lengthwise of the channel towards the stern over the entire length of the helical channel.

9. A ship's hull as defined in claim 8 in which said line drawn from said center of curvature (R) to said place (Q) where said tangency is reached runs from said center of curvature at an angle to the horizontal not more than +35° nor less than −50°.

10. A hull for a ship as defined in claim 8 in which the concave portions of all the cross-sectional profiles of said helical channel over its entire length are such that if profiles relating to different cross sections are so displaced and/or turned in relation to each other that the most concave parts make contact with each other but do not intersect, the concave part of a profile relating to a more forward portion of a channel in every case encompasses all the concave parts of the tangent profile relating to a more aft portion of the same channel.

11. A hull for a ship as defined in claim 10, in which for any profile of the helical channel where there is a vertical line tangent to the surface of said shaft shroud root, the distance along a line drawn from the intersection (Z) of said vertical line with the overlying surfaces of said helical channel to said center of curvature (R), measured between said intersection (Z) and the intersection (T) of said line (ZR) passing through said center of curvature (R) with a lower surface of said helical channel, which is also a surface of said propeller shaft shroud root, is greater than the corresponding distance for any profile of said helical channel farther astern, and in which hull the radial clearance in said annular space surrounding the propeller shaft shroud between said propeller shaft shroud and a concave portion of the hull spaced therefrom at the forward edge of the propeller hub is not more than the sum of the propeller blade length and the maximum diameter of the propeller hub.

12. A hull for a ship as defined in claim 8 in which the taper of immersed cross-sectional area of the hull towards the stern, in order to reduce the towing resistance of the hull, is such that the trend of the square root of the total immersed hull cross-sectional ara, including the propeller shaft shroud cross-sections, as it varies longitudinally of the hull, is for at least one longitudinal position forward of the aft ends of the helical channels, equal to the function $$F(s) = C_1\{1 - C_2(s_{mp} - s)^m\}$$

wherein $C_1$ is the square root of the immersed cross-sectional area of the main section of the hull at the beginning of the stern taper $(s_{mp} - s)$ is the distance astern of said main hull section, $C_2$ is a constant chosen so that at the aft ends of the helical channels the above equality will hold while m has a value not less than 2 nor greater than 4 such that either the two functions have a common tangent at said aft helical channel ends or else they have another point of equal value at some position in that portion of the length of the ship where said clear annular spaces about the propeller shaft shrouds are located.

13. A hull for a ship as defined in claim 12 in which between said main hull section and the aft ends of the helical channels the square root of the difference between the immersed cross-sectional area of the hull and the cross-sectional area of the shaft shrouds measured at the aft ends of the helical channels, is greater than the function $$f(s) = C_3\{1 - C_4(s_{mp} - s)^i\}$$

wherein i is not less than 2 nor more than 4 and wherein $C_3, C_4$ and i are constants chosen so that f(s) will, for at least one position corresponding to the location of said annular spaces about the propeller shaft shrouds, be equal to the square root of the immersed cross-sectional area of the hull not counting in the shaft shroud cross-sections.

14. A hull for a ship as defined in claim 13 wherein $C_3^2$ is greater than $C_1^2 - \gamma_{s2}$, where $\gamma_{s2}$ is the aggregate cross-sectional area of the shaft shrouds measured at the aft end of the helical channels.

15. A hull for a ship as defined in claim 14 wherein a rectilinear aft extension, beyond the position of the front edge of the propeller hub, of the trend of the square root of the total immersed cross-sectional area of the hull including the shaft shroud and shroud root cross-sections makes an intersection at an obtuse angle with the trend of the square root of the immersed cross-sectional area of the hull not counting in the shaft shroud cross-sections, or with the rectilinear extension of said last-mentioned trend aft of the position of the aft end of the immersed portion of the hull.

16. A hull for a ship as defined in claim 8 in which the design of each helical channel and the hull portions adjacent thereto is such that the mean peripheral component $V_T$ of the incident flow to the corresponding propeller disc with respect to the radial distance $r_q$ from the propeller axis at which the average propeller thrust produced has its maximum value, is larger than $$V_{Tm} = 0.3 \frac{8}{\pi q} \cdot \frac{g}{\delta} \cdot \frac{M_e}{D_e^3 V_A}$$

and smaller than $$V_{TM} = 0.9 \frac{8}{\pi q} \cdot \frac{g}{\delta} \cdot \frac{M_e}{D_e^3 V_A}$$

wherein $M_e$ is the mean torque, which is transmitted by the propeller shaft during one revolution on average to the propeller coming into consideration;

$V_A$ is the mean axial component of the incident flow speed in the propeller circle;

$D_e$ is the diameter of the propeller coming into consideration;

g is the acceleration due to gravity;

$\delta$ is the specific weight of the water; and q is $2r_q/D_e$.

17. A hull for a ship as defined in claim 16 in which the absolute value of the first derivative of the effective cross-sectional area X in the case of each helical channel bounded by the substantially concave portion of the helical wall of the channel, a portion of the convex wall of the shaft shroud root and a vertical line tangent to said convex wall of the shaft shroud root and intersecting said helical wall, considered as function of the distance of the ordinate station of the cross-section from a fixed reference station on the base line, has a maximum value at the ordinate station ($s_2$) situated at the stern end of the helical channel, which is not larger than $$\Lambda \left( 2 \frac{V_{TM}}{V_A} + C_t \right)$$

and not smaller than $$\Lambda \frac{V_{Tm}}{V_A},$$

wherein:

$$V_{Tm} = 0.3 \frac{8}{\pi q} \frac{g}{\delta} \frac{M_e}{D_e^3 V_A}$$

$$V_{TM} = 0.9 \frac{8}{\pi q} \frac{g}{\delta} \frac{M_e}{D_e^3 V_A}$$

$M_e$ is the mean torque, which is transmitted by the propeller shaft during one revolution on average to the propeller coming into consideration;

$V_A$ is the mean axial component of the incident flow speed in the propeller circle;

$D_e$ is the diameter of the propeller coming into consideration;

g is the acceleration due to gravity;

$\delta$ is the specific weight of the water;

q is $2r_q/D_e$, and $\Lambda$ is the minimum distance between the concave wall of the annular space around the propeller shaft shroud and the convex wall of the associated shaft shroud at the stern end of the shaft shroud and $C_t$ is a constant equal to the contangent of the angle between the outer skin of the hull (LQJ) and the plane of the section.

18. A hull for a ship as defined in claim 8 in which at least a portion of the drive mechanism connected with its own propeller is arranged, at ordinate stations corresponding to the location of the helical channel, in space within the corresponding shaft shroud root, between the neighborhood of the propeller shaft and a portion of the hull skin not belonging to the helical channel portion of the channel system.

19. A hull for a ship as defined in claim 8 in which the athwartship profiles of the outer skin of the hull not belonging to the channel system astern of the main section of the hull, have only zones which are convex to the outside or in the extreme are flat.

20. A hull for a ship as defined in claim 8 in which each propeller provided at the stern end of a shaft and shaft shroud associated with one helical channel has just two propeller blades.

21. A hull for a ship as defined in claim 8 in which the end, on the stern side, of the wall delimiting each helical channel of the hull merges with an annular nozzle structure (K) that surrounds the propeller (E) located at the end of the particular helical channel.

22. A hull for a ship as defined in claim 21 in which the axis of the annular nozzle (K) surrounding a propeller forms an angle differing from zero with the axis of the shaft of that propeller.

23. A hull for a ship as defined in claim 21 in which the axis of the annular nozzle (K) surrounding a propeller forms an angle differing from zero with the longitudinal direction of the hull.

24. A hull for a ship as defined in claim 21 in which the cross-sections of said nozzle (K) differ in shape in at least two mutually transverse cross-sectional planes passing through its axis.

25. A hull for a ship as defined in claim 21 in which the cross-sections of the nozzle (K) in at least two mutually transverse radial planes passing through the axis of the shaft of the propeller surrounded by said nozzle differ in shape.

26. A hull for a ship having a pair of counter-rotating propellers on opposite sides of the lengthwise vertical median plane of the ship on the stern portion of the ship for driving the ship by rotation of the propellers, each on a propeller shaft, in the direction in which the propeller blades move downward when they are in the quadrant of their revolution directed towards said median plane, said hull including for each propeller shaft a shaft shroud body extending aft from a propeller shaft shroud root bulging from the portion of the hull in which the hull cross-section below the waterline tapers towards the stern of the hull, and said hull being further provided with a pair of helical channels affecting the profiles of said shroud roots as well as of said hull portion and respectively leading to each propeller so as to lead water, during forward motion to the ship, with a component of twist around the aft portion of the shaft shroud, to the path of the propeller blades, in the direction of twist that is contrary to the direction of revolution of the propeller, in which hull there is incorporated the improvement consisting in that:

the helical channel in each case terminates by merger into a clear annular space surrounding the propeller shaft shroud at a location where the channel profile (UQT) reaches substantial tangency to the aft end of an external hull skin surface (LQS) connecting the main portion of the hull to the propeller shaft shroud and the line (RQ) drawn to the place (Q) where said tangency is reached from the center of curvature (R) of the portion of the shaft shroud surface tangent to a vertical line on the opposite side of the shaft shroud, which line lies in an athwartship plane passing through said place of reaching tangency, runs, from said center of curvature, at an angle not more than 40° above the horizontal, nor more than 60° below the horizontal, the helical channels merge on the afterbody of the hull with a single keel channel;

on the forebody of the hull said keel channel divides into two channels, extending towards the bow from the place of division, which two channels are symmetrical with respect to the middle of the ship;

the most concavely bent portion of the profile of the helical channel is in each case near the point (P) of tangency thereto of a line drawn through the center of curvature of the profile, in the same athwartship shroud root tangent to a vertical line, for all parts of the propeller shroud root having a profile passing through the vertical, and the curvature of said most concavely bent portion of said profile does not decrease lengthwise of the channel towards the stern over the entire length of the helical channel.

27. A hull for a ship having a first pair and a second pair of counter-rotating propellers each of said pairs consisting of propellers respectively located symmetrically on opposite sides of the lengthwise vertical median plane of the hull on the stern portion of the ship for driving the ship by rotation of the propellers, each on a propeller shaft, in the direction in which the propeller blades move downward when they are in the quadrant of their revolution directed towards said median plane, said first pair constituting an inner pair located farther aft than said second pair, which constitutes an outer pair, said hull including for each propeller shaft a shaft shroud body extending aft from a propeller shroud root bulging from the portion of the hull in which the hull cross-section below the waterline tapers towards the stern of the hull, and said hull being further provided with two pairs of helical channels affecting the profiles of said shroud roots as well as of said hull portion and respectively leading to each propeller so as to lead water, during forward motion of the ship with a component of twist around the aft portion of the shaft shroud, to the path of the propeller blades, in the direction of twist that is contrary to the direction of revolution of the propeller, in which hull there is incorporated the improvement consisting in that:

the helical channel in each case terminates by merger into a clear annular space surrounding the propeller shaft shroud at a location where the channel profile (UQT) reaches substantial tangency to the aft end of an external hull skin surface (LQS) connecting the main portion of the hull to the propeller shaft shroud and the line (RQ) drawn to the place (Q) where said tangency is reached from the center of curvature (R) of the portion of the shaft shroud surface tangent to a vertical line on the opposite side of the shaft shroud, which line lies in an athwartship plane passing through said place of reaching tangency, runs, from said center of curvature, at an angle not more than 40° above the horizontal, nor more than 60° below the horizontal, the most concavely bent portion of the profile of the helical channel is in each case near the point (P) of tangency thereto of a line drawn through the center of curvature of the profile, in the same athwartship vertical profile plane, of the part of the propeller shroud root tangent to a vertical line, for all parts of the propeller shroud root having a profile passing through the vertical, and the curvature of said most concavely bent portion of said profile does not decrease lengthwise of the channel towards the stern over the entire length of the helical channel.

28. A hull for a ship having an odd number of propellers in which:

at least the convex portions of the hull located forward of at least some concave hull portions produced by the presence of a helical channel in the hull are asymmetrically shaped underneath the waterline with respect to the vertical plane passing through the bow and stern waterline extremities so as to produce, when the hull moves through the water, a flow of water relative to the hull greater and faster on one side than on the other side, thereby to produce a vortex in the wake of the keel, and said helical channel is provided in the after portion of the hull leading from a portion of the hull bottom where water flowing into said channel can readily pick up energy from the pre-development of said keel wake vortex and leading to a place forward of the middle or only propeller of the ship, so as to guide and reinforce said keel wake vortex and thereby to counter the vortex producing action of said propeller at the cruising speed of the ship and thus improve the propeller efficiency, said propeller being driven in a rotary direction opposite to that of the keel-wake vortex guided by said helical channel.

29. A hull for a ship as defined in claim 28 in which said helical channel, in order to assure an adequate amount of equalization of thrust development over the revolution path of each propeller blade and to mitigate early appearance of cavitation in the upper part of said revolution path:

the shaft of said middle or only propeller is located in a shroud extending beyond the aft end of said helical channel and merging at said aft end of said helical channel into a shroud root bulge of the ship's hull shaped so as to cooperate in the provision of said helical channel;

the helical channel terminates by merger into a clear annular space surrounding said shaft shroud at a location where the channel profile (UQT) reaches substantial tangency to the aft end of an external skin surface (LQS) connecting the main portion of the hull to the propeller shaft shroud, and the line (RQ) drawn to said tangency location (Q) from the center of curvature (R) of the portion of the shaft shroud surface tangent to a vertical line on the opposite side of said shaft shroud and lying in an athwartship plane passing through said tangency location runs, from said center of curvature at an angle not more than 40° above the horizontal nor more than 60° below the horizontal.

30. A ship's hull as defined in claim 29 in which said line (RQ) drawn from said center of curvature (R) to said place (Q) where said tengency is reached runs at an angle not more than 35° above the horizontal nor more than 55° below the horizontal.

31. A hull for a ship as defined in claim 29 in which the portion of maximum curvature of the profile of the helical channel is in each case near the point (P) of tangency thereto of a line drawn through the center of curvature of the profile, in the same athwartship vertical profile plane, of the part of said propeller shaft shroud root tangent to a vertical line, for all parts of said propeller shaft shroud root having a profile passing through the vertical, and in which, further, the curvature of said profile portion of maximum curvature does not decrease lengthwise of the channel towards the stern.

32. A hull for a ship as defined in claim 31 in which the concave portion of all the cross-sectional profiles of said helical channel over its entire length are such that if profiles relating to different cross-sections are so displaced and/or turned in relation to each other than the most concave parts make contact with each other but do not intersect, the concave part of a profile relating to a more forward portion of a channel in every case encompasses all the concave parts of the tangent profile relating to a more aft portion of the same channel.

33. A hull for a ship as defined in claim 32 in which, for any profile of the helical channel where there is a vertical line tangent to the surface of said shaft shroud root, the distance along a line drawn from the intersection of said line (Z) of said vertical line with the overlying surfaces of said helical channel to said center of curvature (R), measured between said intersection (Z) and the intersection (T) of said line (ZR) passing through said center of curvature (R) with a lower surface of said helical channel which is also a surface of said propeller shaft shroud root, is greater than the corresponding distance for any profile of said helical channel farther astern, and in which hull the radial clearance in said annular space surrounding the propeller shaft shroud between said propeller shaft shroud and a concave portion of the hull spaced therefrom at the forward edge of the propeller hub is more than the propeller blade length and not more than the sum of the propeller blade length and the maximum diameter of the propeller hub.

34. A hull for a ship as defined in claim 29, in which there is provided, mounted on said hull, a single propeller and a single propeller shaft and in which, further the taper of hull cross-sectional area towards the stern, in order to reduce the towing resistance of the hull, is such that the trend of the square root of the total immersed cross-sectional area of the hull, including the propeller shaft shroud cross-section, as it varies longitudinally of the hull, is for at least one longitudinal position forward of the aft end of the helical channel, equal to the function $$F(s) = C_1\{1 - C_2(s_{mp} - s)^m\}$$

wherein $C_1$ is the square root of the immersed cross-sectional area of the main section of the hull at the beginning of the stern taper, $(s_{mp} - s)$ is the distance astern of said main hull section, $C_2$ is a constant chosen so that at the aft end of the helical channel the above equality will hold while m has a value not less than 2 nor greater than 4 such that either the two functions have a common tangent at said aft helical channel end or else they have another point of equal value at some position in that portion of the length of the ship where said clear annular space about the propeller shaft shroud is located.

35. A hull for a ship as defined in claim 29, in which there are provided, mounted on said hull, at least one pair of propellers in addition to said middle propeller, in which, further, each propeller is provided with a shaft and each shaft with a shaft shroud and a helical channel leading to a place forward of the propeller is also provided for each of said additional propellers, and in which the immersed cross-sectional area of the hull towards the stern, in order to reduce the towing resistance of the hull, is such that the trend of the square root of the total immersed cross-sectional area of the hull, including propeller shaft shroud cross-sections, as it varies longitudinally of the hull, is for at least one longitudinal position forward of the aft ends of the aftermost helical channel, equal to the function $$F(s) = C_1\{1 - C_2(s_{mp} - s)^m\}$$

wherein $C_1$ is the square root of the immersed cross-sectional area of the main section of the hull at the beginning of the stern taper, $(s_{mp} - s)$ is the distance astern of said main hull section, $C_2$ is a constant chosen so that at the aft end of the aftermost helical channel the above equality will hold while m has a value not less than 2 nor greater than 4 such that either the two functions have a common tangent at said aftermost helical channel end or else they have another point of equal value at some position in that portion of the length of the ship where the aftermost annular space surrounding a propeller shaft shroud is located.

36. A hull for a ship as defined in claim 29 in which between said main hull section and the aft ends of the helical channel the square root of the difference between the total hull cross-sectional area, including the shaft shroud cross-section where present, and the aggregate cross-sectional area of the shaft shroud measured at the aft end of the helical channel ($\gamma_{s2}$) is greater than the function $$f(s) = C_3$$

wherein i is not less than 2 nor more than 4 and wherein $C_3$, $C_4$ and i are constants chosen so that f(s) will, for at least one position corresponding to the location of said annular space about the propeller shaft shroud, be equal to the square root ($\sqrt{\beta(S)}$) of the hull cross-sectional area not counting in the shaft shroud cross-section.

37. A hull for a ship as defined in claim 36 wherein $C_3^2$ is greater than $C_1^2 - \gamma_{s2}$ where $\gamma_{s2}$ is the aggregate cross-sectional area of the shaft shroud measured at the aft end of the helical channel.

38. A hull for a ship as defined in claim 37 wherein a rectilinear aft extension, beyond the position of the front edge of the propeller hub, of the trend of the square root of the total immersed cross-sectional area of the hull including the shaft shroud cross-sections makes an intersection at an obtuse angle with the trend of the square root of the immersed cross-sectional area of the hull not counting in the shaft shroud cross-sections, or with the rectilinear extension of said first-mentioned trend aft of the position of the aft end of the immersed portion of the hull.

39. A hull for a ship as defined in claim 28 in which the design of said helical channel and the hull portions adjacent thereto is such that the mean peripheral component $V_T$ of the incident flow to the corresponding propeller disc with respect to the radial distance $r_q$ from the propeller axis at which the average propeller thrust produced has its maximum value, is larger than $$V_{Tm} = 0.3 \frac{g}{\pi q} \cdot \frac{g}{\delta} \cdot \frac{M_e}{D_e^3 V_A}$$

and smaller than $$V_{TM} = 0.9 \frac{g}{\pi q} \cdot \frac{g}{\delta} \cdot \frac{M_e}{D_e^3 V_A}$$

in which
$M_e$ is the mean torque, which is transmitted by the propeller shaft during one revolution on average to the propeller coming into consideration;
$V_A$ is the mean axial component of the incident flow speed in the propeller circle;
$D_e$ is the diameter of the propeller coming into consideration;

g is the acceleration due to gravity;

δ is the specific weight of the water; and q is $2r_q/D_e$.

40. A hull for a ship as defined in claim 39 in which the absolute value of the first derivative of the effective cross-sectional area X of the helical channel considered as a function of the distance of the ordinate station of the cross-section from a fixed reference station on the base line, has a maximum value at the ordinate station ($S_2$) situated at the stern end of the helical channel, which is not larger than $$\Lambda \left( 2 \frac{V_{TM}}{V_A} + C_t \right)$$

and not smaller than t,1311 wherein $$V_{Tm} = 0.3 \frac{8}{\pi q} \frac{g}{\delta} \frac{M_e}{D_e^3 V_A}$$

$$V_{TM} = 0.9 \frac{8}{\pi q} \frac{g}{\delta} \frac{M_e}{D_e^3 V_A}$$

$M_e$ is the mean torque, which is transmitted by the propeller shaft during one revolution on average to the propeller coming into consideration;

$V_A$ is the mean axial component of the incident flow speed in the propeller circle;

$D_e$ is the diameter of the propeller coming into consideration;

g is the acceleration due to gravity;

δ is the specific weight of the water;

q is $2r_q/D_e$, and

Λ is the minimum distance between the concave wall of the annular space around the propeller shaft shroud and the convex wall of the associated shaft shroud at the stern end of the shaft shroud and $C_t$ is a constant equal to the contangent of the angle between the outer skin of the hull (LQJ) and the plane of the section at the point (Q) where the outer wall (LQJ), at the stern end of the helical channel and the beginning of said annular space, meets the inner wall (VTQUZM) of the helical channel.

41. A hull for a ship as defined in claim 28 in which said propeller is the only propeller and a portion of the under-water afterbody of the hull lying on one side of said vertical plane through said extremities of the hull, comprises a substantial concavity in the form of a channel leading aft to a helical channel serving said propeller and the corresponding portion of the hull on the other side of said vertical plane is devoid of concavities and has at least approximately the shape of a conventional hull for a propellerless ship.

42. A hull for a ship as defined in claim 28 in which each propeller provided at the stern end of a shaft and shaft shroud associated with one helical channel has just two propeller blades.

43. A hull for a ship as defined in claim 28 in which the end, on the stern side, of the wall delimiting each helical channel of the hull merges with an annular nozzle structure that surrounds the propelller (E) located at the end of the particular helical channel.

44. A hull for a ship as defined in claim 43 in which the axis of the annular nozzle (K) surrounding a propeller forms an angle differing from zero with the axis of the shaft of that propeller.

45. A hull for a ship as defined in claim 43 in which the axis of the annular nozzle (K) surrounding a propeller forms an angle differing from zero with the longitudinal direction of the hull.

46. A hull for a ship as defined in claim 43 in which the cross-sections of said nozzle (K) differ in shape in at least two mutually transverse cross-sectional planes passing through its axis.

47. A hull for a ship as defined in claim 43 in which the cross-sections of the nozzle (K) in at least two mutually transverse radial planes passing through the axis of the shaft of the propeller surrounded by said nozzle differ in shape.

48. A hull for a ship as defined in claim 28 in which the athwartships profiles of the hull not belonging to the channel system, astern of the main section of the hull, has only zones which are convex to the outside or in the extreme are flat.

49. A hull for a ship having an odd number of propellers, in which:

the longitudinal median plane of the hull passes through the propeller disc of the middle or only propeller at a location offset from the propeller axis;

the hull is asymmetrically shaped underneath the waterline with respect to the vertical plane passing through the bow and stern waterline extremities so as to produce, when the hull moves through the water, a flow of water relative to the hull greater and faster on one side than on the other side, thereby to produce in the wake of the keel a vortex having its rising side towards the side of the hull around which there is the greater and faster water flow, and a helical channel is provided in the after portion of the hull leading from a portion of the hull bottom where water flowing into said channel can readily pick up energy from the pre-development of said keel wake vortex and leading to a place forward of the middle or only propeller of the ship, so as to guide and reinforce said keel wake vortex so as to counter the vortex producing action of said propeller at the cruising speed of the ship and thereby improving propeller efficiency, said propeller being driven in a rotary direction opposite to that of the keel-wake vortex guided by said helical channel.

* * * * *

UNITED STATES PATENT AND TRADEMARK OFFICE
CERTIFICATE OF CORRECTION

PATENT NO. : 4,363,630
DATED : December 14, 1982
INVENTOR(S) : Giovanni B. Tommasi Di Vignano It is certified that error appears in the above—identified patent and that said Letters Patent is hereby corrected as shown below:

On the first page of the patent, line [76], correct the inventor's name to read as follows:

-- Giovanni B. Tommasi Di Vignano --.

Signed and Sealed this

Seventh Day of June 1983

[SEAL]

Attest:

DONALD J. QUIGG

Attesting Officer

Acting Commissioner of Patents and Trademarks